(12) United States Patent
Bannai et al.

(10) Patent No.: US 8,741,445 B2
(45) Date of Patent: Jun. 3, 2014

(54) ALUMINUM OR ALUMINUM ALLOY MATERIAL HAVING SURFACE TREATMENT COATING FILM, AND METHOD FOR TREATING A SURFACE THEREOF

(75) Inventors: Hirokatsu Bannai, Tokyo (JP); Yoshiyuki Okamoto, Kariya (JP); Kenji Nakamura, Kariya (JP); Takayuki Hirose, Kariya (JP); Osamu Kasebe, Kariya (JP); Shin Nishiya, Kariya (JP); Kengo Kobayashi, Kariya (JP)

(73) Assignees: Nihon Parkerizing Co., Ltd., Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 13/579,183
(22) PCT Filed: Feb. 8, 2011
(86) PCT No.: PCT/JP2011/052572
§ 371 (c)(1),
(2), (4) Date: Oct. 9, 2012
(87) PCT Pub. No.: WO2011/099460
PCT Pub. Date: Aug. 18, 2011

(65) Prior Publication Data
US 2013/0034743 A1 Feb. 7, 2013

(30) Foreign Application Priority Data
Feb. 15, 2010 (JP) ................. 2010-029756

(51) Int. Cl.
| | |
|---|---|
| B32B 15/04 | (2006.01) |
| B32B 15/08 | (2006.01) |
| B32B 15/20 | (2006.01) |
| C23C 22/44 | (2006.01) |
| C23C 28/00 | (2006.01) |
| B05D 3/00 | (2006.01) |
| B05D 3/02 | (2006.01) |
| F28F 13/18 | (2006.01) |
| F28F 19/02 | (2006.01) |
| C09D 5/08 | (2006.01) |
| C09D 5/16 | (2006.01) |

(52) U.S. Cl.
USPC .......... 428/626; 428/650; 428/651; 428/660; 428/639; 428/633; 428/469; 428/472.1; 428/461; 427/299; 427/327; 427/372.2; 427/385.5; 427/419.2

(58) Field of Classification Search
USPC ......... 428/626, 624, 650, 651, 660, 639, 632, 428/633, 457, 469, 472, 472.1, 427.2, 428/472.3, 461
See application file for complete search history.

(56) References Cited

U.S. PATENT DOCUMENTS
| | | |
|---|---|---|
| 5,538,078 A | 7/1996 | Mizuno et al. |
| 6,689,481 B2 | 2/2004 | Hamamura et al. |

(Continued)

FOREIGN PATENT DOCUMENTS
| | | |
|---|---|---|
| EP | 1 205 523 A1 | 5/2002 |
| JP | A-07-323500 | 12/1995 |

(Continued)

OTHER PUBLICATIONS

International Search Report issued in International Application No. PCT/JP2011/052572 dated Apr. 26, 2011 (with translation).

(Continued)

*Primary Examiner* — Michael E La Villa
(74) *Attorney, Agent, or Firm* — Oliff PLC

(57) ABSTRACT

Provided is an aluminum or aluminum alloy material having a surface treatment coating film on a surface of a substrate formed by an aluminum or aluminum alloy. The aluminum or aluminum alloy material has: a substrate formed by an aluminum or aluminum alloy; and a first protective layer and a second protective layer in the order on a surface of the substrate, wherein the first protective layer is a conversion coating film including vanadium and at least one or more types of metals selected from titanium, zirconium, and hafnium, the second protective layer is an organic coating film having a composition that includes (1) a chitosan derivative and a solubilizing agent, (2) a modified polyvinyl alcohol formed by graft polymerization of a hydrophilic polymer to a side chain of polyvinyl alcohol, and (3) a water-soluble crosslinking agent.

9 Claims, 3 Drawing Sheets

(56) References Cited

U.S. PATENT DOCUMENTS

| | | |
|---|---|---|
| 6,869,677 B1 | 3/2005 | Uehara et al. |
| 2003/0039849 A1* | 2/2003 | Inbe et al. .................... 428/457 |
| 2006/0083710 A1 | 4/2006 | Joerger et al. |
| 2010/0086789 A1 | 4/2010 | Simon et al. |

FOREIGN PATENT DOCUMENTS

| | | |
|---|---|---|
| JP | A-2000-345362 | 12/2000 |
| JP | A-2008-150585 | 7/2008 |
| JP | A-2009-108111 | 5/2009 |
| WO | WO 2008/071752 A1 | 6/2008 |

OTHER PUBLICATIONS

Oct. 2, 2013 Extended European Search Report issued in Application No. 11742204.8.

* cited by examiner

10

ALUMINUM OR ALUMINUM ALLOY MATERIAL HAVING SURFACE TREATMENT COATING FILM, AND METHOD FOR TREATING A SURFACE THEREOF

FIELD OF THE INVENTION

The present invention relates to an aluminum or aluminum alloy material having a surface treatment coating film, and to a surface treatment method therefor. In particular, the invention relates to a heat exchanger used by incorporating the aluminum or aluminum alloy material in automobiles or the like, and to a surface treatment method therefor.

BACKGROUND ART

Many heat exchangers, particularly those having fins made of aluminum or aluminum alloy are designed to provide the maximum surface area for a heat radiating unit and a cooling unit to allow high heat-radiation efficiency or cooling efficiency in the limited space. Because of that, a gap between the fins is extremely narrow. When using these heat exchangers for cooling, moisture in the air is sometimes condensed on fin surfaces into droplets of water to adhere onto the surfaces. Such adhesion of the water droplets causes clogging between the fins and thereby increases draft resistance, thus reducing heat exchange efficiency.

In addition, the condensed water on the fin surfaces may induce corrosion of the aluminum or aluminum alloy to produce a large amount of aluminum oxide in a white powder form on the fin surfaces. Furthermore, when the fins are exposed to high temperature conditions while retaining the condensed water on the surfaces, a high-temperature and high-humidity atmosphere is produced, whereby a thick layer of white powdery aluminum oxide may be produced on the fin surfaces. The white powder of aluminum oxide deposited on the fin surfaces is scattered inside the automobile room and the like by a fan of the heat exchanger. This makes the user feel uncomfortable.

In addition, when the condensed water on the fin surfaces stays, bacteria easily grow on a surface of the aluminum or aluminum alloy, which can cause bad odor or damage the health of the user. Moreover, when an odor component of tobacco smoke or the like supplied to the heat exchanger from the inside of the automobile room or the like adheres to and accumulates on the surface of the aluminum or aluminum alloy, bad odor is released from the heat exchanger.

Accordingly, it is desirable to provide a function of maintaining hydrophilicity, high corrosion resistance, antibacterial properties, and deodorant properties to the aluminum or aluminum alloy forming the heat exchanger.

As a conventional technique to solve those problems, as in Patent Document 1, there has been proposed a method in which a conversion layer is formed on a surface of an aluminum containing metal substrate and thereon is formed a resin layer having a water-insoluble three-dimensional network structure by crosslinking reaction between a water-soluble crosslinking polymeric compound having a hydrophilic group such as a sulfonate group and a crosslinking agent, whereby the network structure retains the water-soluble polymeric compound to prevent the elution thereof. The Literature describes that the method can uniformly form, on the aluminum containing metal material, a resin coating film maintaining hydrophilicity, water resistance, and resistance to swelling by water and having excellent antibacterial properties and odor production-preventing properties over a long period of time. In this method, however, an odor component of tobacco smoke or the like supplied to the heat exchanger from the inside of the automobile room or the like adsorbs to and accumulates on the hydrophilic coating film. Thus, it has been impossible to maintain sufficient deodorant properties, as well as to sufficiently achieve corrosion resistance in atmospheres subjected to high temperature and high humidity.

In addition, as in Patent Document 2, there has been proposed a method for maximally preventing odor components of tobacco or the like from adhering to a heat exchanger made of aluminum alloy by applying also a coating of an organic hydrophilic coating film containing (A) one or more types of compounds selected from chitosan and derivatives thereof and (B) one or more types of specific organic compounds having two or more carboxyl groups per molecule such that a total solid content thereof (A)+(B) is 20% by mass or more, on at least a part of a surface of the heat exchanger made of aluminum alloy. However, the method has failed to maintain hydrophilicity over a long period of time.

PRIOR ART REFERENCES

Patent Documents

Patent Document 1: Japanese Laid-Open Patent Application No. 1995-323500
Patent Document 2: Japanese Laid-Open Patent Application No. 2008-150585

SUMMARY OF THE INVENTION

The Problems Solved by the Invention

The present invention has been accomplished to solve the above-described conventional problems. It is an object of the present invention to provide an aluminum or aluminum alloy material produced by forming a surface treatment coating film that can maintain hydrophilicity, high corrosion resistance, antibacterial properties, and deodorant properties over a long period of time on a surface of an aluminum or aluminum alloy substrate, and a surface treatment method therefor. In addition, it is another object of the present invention to provide a heat exchanger made of aluminum or aluminum alloy incorporated and used, particularly, in automobiles and the like.

Problem Resolution Means

The aluminum or aluminum alloy material according to the present invention to solve the above-discussed problems, comprises: a substrate formed by an aluminum or aluminum alloy; and a first protective layer and a second protective layer in the order on a surface of the substrate, wherein the first protective layer is a conversion coating film including vanadium and at least one or more types of metals selected from titanium, zirconium, and hafnium, a coating weight of the vanadium is 0.3 to 200 mg/m$^2$, and a total coating weight of the at least one or more types of the metals selected from titanium, zirconium, and hafnium is 0.1 to 5 in mole ratio when the coating weight of the vanadium is 1; and the second protective layer is an organic coating film having a composition that includes (1) a chitosan derivative and a solubilizing agent, (2) a modified polyvinyl alcohol formed by graft polymerization of a hydrophilic polymer to a side chain of polyvinyl alcohol, and (3) a water-soluble crosslinking agent, a total of the compounds (1) to (3) is 50% by mass or more of the entire second protective layer in terms of solid content, solid content mass ratios of the respective compounds (1) to (3) are $(1)/\{(1)+(2)+(3)\}=0.1$ to 0.8, $(2)/\{(1)+(2)+(3)\}=0.1$ to 0.6, and $(3)/\{(1)+(2)+(3)\}=0.05$ to 0.3; and a dry mass per unit area is 0.05 to 6.0 g/m$^2$.

According to this invention, on the aluminum or aluminum alloy substrate is formed the first protective layer having excellent corrosion resistance within the above ranges, and additionally, on the first protective layer is formed the second protective layer composed of the composition including the compound (1) improving mainly antibacterial properties and deodorant properties and the compounds (2) and (3) improving mainly hydrophilicity within the above ranges. Therefore, the aluminum or aluminum alloy material having such a surface treatment coating film can sufficiently maintain hydrophilicity, high corrosion resistance, antibacterial properties, and deodorant properties over a long period of time. The aluminum or aluminum alloy material according to the present invention is not only highly applicable to heat exchangers but versatile and can serve other purposes.

In the aluminum or aluminum alloy material according to the present invention, the side chain hydrophilic polymer possessed by the modified polyvinyl alcohol (2) forming the second protective layer is one or more types of polymers selected from polyoxyalkylene ether, polyvinylpyrrolidone, polyvinylamine, and polyethyleneimine.

In the aluminum or aluminum alloy material according to the present invention, the water-soluble crosslinking agent (3) forming the second protective layer is one or more types of acid selected from hydroxyethylidene diphosphonic acid, nitrilotrimethylene phosphonic acid, phosphonobutane tricarboxylic acid, ethylenediamine tetramethylene phosphonic acid, and phytic acid.

A heat exchanger according to the present invention to solve the above-discussed problems, is formed by the aluminum or aluminum alloy material according to the present invention.

According to this invention, the aluminum or aluminum alloy material according to the present invention maintaining hydrophilicity, high corrosion resistance, antibacterial properties, and deodorant properties over a long period of time is used as a material forming a heat exchanger. Therefore, the invention can provide advantageous effects in preventing reduction in heat exchange efficiency, preventing white powder scattering due to corrosion, preventing bacterial growth, preventing odor production due to accumulated adhesion of an odor component of tobacco smoke or the like over a long period of time, thereby achieving comfortable interior atmosphere.

The method for treating a surface of an aluminum or aluminum alloy material according to the present invention to solve the above-discussed problems, comprises in the order of: a surface conditioning step of rendering a surface of an aluminum or aluminum alloy substrate into a state suitable for formation of a conversion coating film; a water-rinsing step; a step of forming a first protective layer made of the conversion coating film on the surface of the aluminum or aluminum alloy substrate; a water-rinsing step; a step of applying a second protective layer as an organic coating film on the first protective layer; and a drying step, wherein the first protective layer is formed from a conversion treatment liquid including vanadium and at least one or more types of metals selected from titanium, zirconium, and hafnium; and the second protective layer is formed from a composition including (1) a chitosan derivative and a solubilizing agent, (2) a modified polyvinyl alcohol obtained by graft polymerization of a hydrophilic polymer to a side chain of polyvinyl alcohol, and (3) a water-soluble crosslinking agent.

In the method for treating a surface of an aluminum or aluminum alloy material, in the first protective layer, a coating weight of the vanadium is 0.3 to 200 mg/m$^2$ and a total coating weight of the at least one or more types of metals selected from titanium, zirconium, and hafnium is 0.1 to 5 in mole ratio when the coating weight of the vanadium is 1; and in the second protective layer, a total of the compounds (1) to (3) is 50% by mass or more, in terms of solid content, of the entire second protective layer, solid content mass ratios of the respective compounds (1) to (3) are $(1)/\{(1)+(2)+(3)\}=0.1$ to 0.8, $(2)/\{(1)+(2)+(3)\}$ 0.1 to 0.6, and $(3)/\{(1)+(2)+(3)\}=0.05$ to 0.3, and a dry mass per unit area is 0.05 to 6.0 g/m$^2$.

Efficacy of the Invention

The aluminum or aluminum alloy material according to the present invention can sufficiently maintain hydrophilicity, high corrosion resistance, antibacterial properties, and deodorant properties over a long period of time. The aluminum or aluminum alloy material according to the invention is highly applicable to heat exchangers, as well as to a wide variety of other purposes.

The heat exchanger according to the present invention provides the advantages of preventing reduction in heat exchange efficiency, preventing the scattering of white powder due to corrosion, preventing bacterial growth, preventing odor production due to the accumulated adhesion of an odor component of tobacco smoke or the like over a long period of time, thereby achieving comfortable interior atmosphere.

The surface treatment method according to the present invention can efficiently obtain the aluminum or aluminum alloy material and the heat exchanger according to the present invention described above with stable quality.

BRIEF DESCRIPTIONS OF THE DRAWINGS

EMBODIMENTS OF THE INVENTION

A more detailed description will be given of an aluminum or aluminum alloy material, a heat exchanger, and a surface treatment method according to the present invention by way of embodiments of the invention.

[Aluminum or Aluminum Alloy Material]

Figure 1:
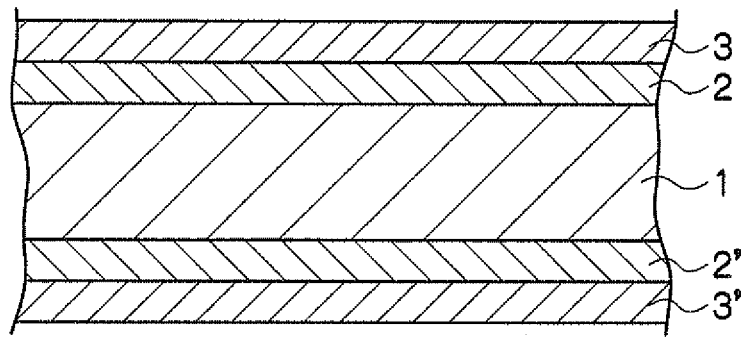
FIG. 1 is a schematic cross-sectional view showing an example of an aluminum or aluminum alloy material according to the present invention.

As shown in FIG. 1, aluminum or aluminum alloy material 10 according to the present invention has first protective layer 2, 2' and second protective layer 3, 3' in the order on a surface of aluminum or aluminum alloy substrate 1. Then, first protective layer 2, 2' is a conversion coating film including vanadium and at least one or more types of metals selected from titanium, zirconium, and hafnium. In addition, second protective layer 3, 3' is an organic coating film composed of a composition including (1) a chitosan derivative and a solubilizing agent, (2) a modified polyvinyl alcohol formed by graft polymerization of a hydrophilic polymer to a side chain of polyvinyl alcohol, and (3) a water-soluble crosslinking agent. The first protective layer and the second protective layer are preferably provided on both surfaces thereof, as shown in FIG. 1, but may be provided on one of the surfaces thereof.

Reference numeral 1 denotes a substrate made of aluminum or aluminum alloy without the first protective layer and the second protective layer, and reference numeral 10 denotes an aluminum or aluminum alloy material on which the first protective layer and the second protective layer as surface treatment coating films have been provided.

(Aluminum or Aluminum Alloy Substrate)

In the aluminum or aluminum alloy substrate, examples of aluminum alloy include aluminum-magnesium alloy, aluminum-silicon alloy, and aluminum-manganese alloy. In addition, examples of aluminum include pure aluminum and inevitable impurity-containing aluminum. The term "or" means that the substrate may be a substrate made of aluminum or a substrate made of aluminum alloy. Alternatively, as the case may be, it means that the substrate may be a complex substrate made of aluminum and aluminum alloy.

Examples of shape of the aluminum or aluminum alloy substrate include a sheet shape, a strip shape, a plate shape, and other molded articles. The molded articles encompass, for example, tubes, fins, hollow plates, and the like used in heat exchangers of air conditioners or the like.

(First Protective Layer)

The first protective layer is provided on the surface of the aluminum or aluminum alloy substrate. The first protective layer is the conversion coating film including vanadium and at least one or more types of metals selected from titanium, zirconium, and hafnium, as an essential composition. The first protective layer includes those essential metal components in a state having any one or two or more of hydroxides, oxides, and complex oxides (hereinafter these may be generically referred to as "oxides and the like"). The oxides and the like are preferably dehydrated. The first protective layer provided on the aluminum or aluminum alloy substrate serves to improve corrosion resistance of the aluminum or aluminum alloy substrate.

Structures and crystallinities of the essential metals in the first protective layer can be confirmed by transmission electron microscopy (TEM) observation of a layer cross-section, a thin film X-ray diffractometry, or glow discharge spectroscopy. In addition, thicknesses thereof can be confirmed by TEM of the layer cross-section.

In the first protective layer, preferably, a coating weight of vanadium is 0.3 to 200 mg/m$^2$ and a total coating weight of the at least one or more types of metals selected from titanium, zirconium, and hafnium is in a range of 0.1 to 5 in mole ratio when the vanadium coating weight is 1.

If the vanadium coating weight is less than 0.3 mg/m$^2$, corrosion resistance can be insufficient. Any vanadium coating weight exceeding 200 mg/m$^2$ increases cost and there can be obtained no improvement in corrosion resistance that is worth the cost. Meanwhile, if the total coating weight of the at least one or more types of metals selected from titanium, zirconium, and hafnium is less than 0.1 in mole ratio when the coating weight of vanadium is 1, barrier properties of the first protective layer against water become insufficient, and furthermore, the adhesiveness with the second protective layer provided thereon also becomes insufficient, so that sufficient corrosion resistance may not be obtainable. In addition, if the total coating weight thereof is more than 5 in mole ratio when the coating weight of vanadium is 1, cost increases and there can be obtained no improvement in corrosion resistance that is worth the cost.

(Second Protective Layer)

The second protective layer is provided on the first protective layer. The second protective layer is the organic coating film composed of a composition including (1) a chitosan derivative and a solubilizing agent, (2) a modified polyvinyl alcohol formed by graft polymerization of a hydrophilic polymer to a side chain of polyvinyl alcohol, and (3) a water-soluble crosslinking agent. In this composition, the compound (1) mainly serves to improve antibacterial properties and deodorant properties, and the compounds (2) and (3) mainly serve to improve hydrophilicity. The second protective layer is formed by applying the composition including the compounds as such. Therefore, the aluminum or aluminum alloy material obtained by applying and forming the second protective layer on the first protective layer can sufficiently maintain hydrophilicity, high corrosion resistance, antibacterial properties, and deodorant properties over a long period of time.

The chitosan derivative and the solubilizing agent as the compound (1) forming the second protective layer serve to provide antibacterial properties and deodorant properties to the second protective layer. The chitosan derivative is involved in a group of compounds prepared by adding one or two or more functional groups selected from glyceryl groups, polyoxyalkylene ether groups, and polyacrylic acid groups to a part or all of primary amino groups of chitosan. The chitosan derivative can be obtained, for example, by mixing chitosan prepared from chitin deacetylated at a rate of 60% or more and 100% or less and the addition compound mentioned above in an aqueous solution and, if needed, heating to cause reaction. The chitosan derivative does not necessarily need to be in a pure state and may include some secondary products or unreacted products produced by the reaction. In addition, the chitosan derivative may be in a powdery or aqueous solution form. Chitosan is a compound obtained by deacetylation of chitin.

The solubilizing agent increases water solubility of chitosan having low water solubility. As the solubilizing agent, polycarboxylic acid is desirable. Examples of polycarboxylic acid include citric acid, butanetetracarboxylic acid, mellitic acid, malic acid, and fumaric acid. The solubilizing agent is preferably in a range of 0.3 to 2.0 at mass ratio with respect to the above-described chitosan derivative.

The modified polyvinyl alcohol as the compound (2) forming the second protective layer is formed by graft polymerization of a hydrophilic polymer to a side chain of polyvinyl alcohol. The modified polyvinyl alcohol thus formed has both the properties of polyvinyl alcohol having excellent immobility against running water and the properties of the side-chain hydrophilic polymer and can maintain extremely favorable hydrophilicity even after deterioration due to running water. The expression "excellent immobility against running water" means that, upon contact of the second protective layer with running water, a component contained in the second protective layer shows an excellent property of being immobile against immersion in running water. Also, the expression "deterioration due to running water" means that a highly hydrophilic component is easily flown away by immersion in water and its hydrophilicity is deteriorated by running-water immersion. In the modified polyvinyl alcohol having the above properties, preferably, the side-chain hydrophilic polymer is one or more types of polymers selected from polyoxyalkylene ether, polyvinylpyrrolidone, polyvinylamine, and polyethyleneimine.

In the modified polyvinyl alcohol, preferably, the polyvinyl alcohol forming the main chain has a polymerization degree ranging from 400 to 3,000 and the hydrophilic polymer forming the side chain has a molecular weight ranging from 1,000 to 200,000.

The water-soluble crosslinking agent as the compound (3) forming the second protective layer is a crosslinking agent that can bind to the side-chain hydrophilic polymer of the modified polyvinyl alcohol as the above-described compound (2) and serves as a crosslinker for binding the modified polyvinyl alcohol to the second protective layer. Accordingly, the water-soluble crosslinking agent, desirably, has a plurality of groups excellent in crosslinking with hydroxyl groups of the modified polyvinyl alcohol. A typical one of such groups is preferably a phosphonic acid group. Specific examples of the water-soluble crosslinking agent having a phosphonic group are preferably one or more types of acid selected from hydroxyethylidene diphosphonic acid, nitrilotrimethylene phosphonic acid, phosphonobutane tricarboxylic acid, ethylenediamine tetramethylene phosphonic acid, and phytic acid.

A dry mass per unit area of the second protective layer is preferably 0.05 to 6.0 g/m$^2$, and more preferably 0.1 to 2.0 g/m$^2$. Setting the dry mass within the range can further improve hydrophilicity, high corrosion resistance, antibacterial properties, and deodorant properties over a long period of time. If the dry mass per unit area of the second protective layer is less than 0.05 g/m$^2$, coatability of the second protective layer becomes insufficient and hydrophilicity, antibacterial properties, and deodorant properties may be insufficient. In addition, if the dry mass per unit area of the second protective layer is more than 6.0 g/m$^2$, an increase is caused in an in-film stress produced upon formation of the second protective layer, which has sometimes caused film separation.

A total of the compounds (1) to (3) contained in the entire second protective layer is preferably 50% by mass or more, and more preferably 60% by mass or more, in terms of solid content. The upper limit is 100% by mass. By setting the total thereof to 50% by mass or more in terms of solid content, sufficient hydrophilicity, antibacterial properties, and deodorant properties can be maintained. If the total thereof in terms solid content is less than 50% by mass, sufficient hydrophilicity, antibacterial properties, and deodorant properties may not be maintained. The total in terms of solid content of the compounds (1) to (3) contained in the entire second protective layer means a total of solid contents corresponding to the compounds (1) to (3) in the organic coating film forming the second protective layer.

More specifically, regarding the compounds (1) to (3) contained in the second protective layer, mass ratios in terms of solid contents (hereinafter referred to as solid content mass ratios) of the respective compounds are preferably $(1)/\{(1)+(2)+(3)\}=0.1$ to $0.8$, $(2)/\{(1)+(2)+(3)\}=0.1$ to $0.6$, and $(3)/\{(1)+(2)+(3)\}=0.05$ to $0.3$. By setting the contents of the compounds (1) to (3) within the above ranges, the properties of the respective compounds can be sufficiently exhibited, which can further improve hydrophilicity, high corrosion resistance, antibacterial properties, and deodorant properties over a long period of time.

If the solid content mass ratio: $(1)/\{(1)+(2)+(3)\}$ is less than 0.1, antibacterial properties may be insufficient. Additionally, in the case of a solid content mass ratio: $(1)/\{(1)+(2)+(3)\}$ exceeding 0.8, hydrophilicity may be insufficient.

If the solid content mass ratio: $(2)/\{(1)+(2)+(3)\}$ is less than 0.1, hydrophilicity after deterioration due to running water may be insufficient. Additionally, if the solid content mass ratio: $(2)/\{(1)+(2)+(3)\}$ is more than 0.6, an odor component of tobacco smoke or the like easily adsorbs to and accumulates on the second protective layer, resulting in insufficient deodorant properties.

If the solid content mass ratio: $(3)/\{(1)+(2)+(3)\}$ is less than 0.05, it is difficult for the compound (2) to be immobilized as a constituent component of the second protective layer, so that hydrophilicity after deterioration due to running water may be insufficient. In addition, in the case of a solid content mass ratio: $(3)/\{(1)+(2)+(3)\}$ of more than 0.3, cost increases and there is obtained no advantageous effect worth it.

FT-IR analysis allows confirmation that the second protective layer thus formed is composed of a composition including the above-described compounds (1) to (3). Specifically, FT-IR analysis is performed on a surface of a sample workpiece to measure a ratio among a peak of the carboxyl group included in (1), a peak of the hydrophilic polymer forming (2), and a peak of the phosphoric acid group included in (3) in the second protective layer. With the peak ratio, solid content mass ratio can be determined.

To the composition for forming the second protective layer, as needed, there can be added an anti-rust agent, a leveling agent, a filler such as colloidal silica or plastic pigment, a coloring agent, a surfactant, a defoaming agent, and/or the like in a range not damaging the effect of the present invention and coating film performance.

As described above, since the first protective layer and the second protective layer are provided in that order on the aluminum or aluminum alloy substrate, hydrophilicity, high corrosion resistance, antibacterial properties, and deodorant properties can be sufficiently maintained over a long period of time. The material is not only highly applicable to heat exchangers but also applicable to a wide variety of other purposes.

[Heat Exchanger]

Figure 2:
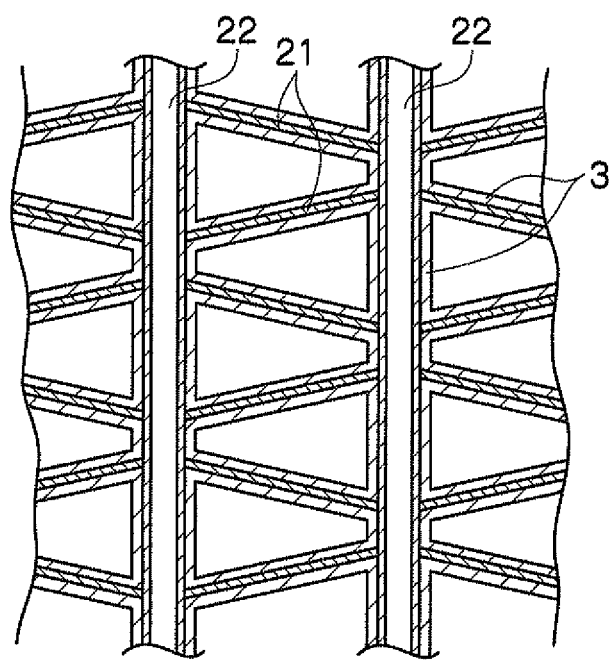
FIG. 2 is a schematic cross-sectional view showing an example of a heat exchanger according to the present invention.

Heat exchanger 20 according to the present invention is, as shown in FIG. 2, made of aluminum or aluminum alloy material 10 according to the present invention described above. Thereby, there can be obtained advantageous effects in preventing reduction in heat exchange efficiency, preventing white powder scattering due to corrosion, preventing bacterial growth, preventing odor production due to the accumulated adhesion of an odor component of tobacco smoke or the like over a long period of time, thereby achieving comfortable interior atmosphere. In an example of FIG. 2, there is shown heat exchanger 20 made of aluminum or aluminum alloy having heat radiating portions (fins) 21, 21 between adjacent refrigerant pipes (tubes) 22, 22. However, the present invention is not restricted to only heat exchanges having such a shape. In other words, the heat exchanger may have any shape, such as tubular (hollow tubular), solid tubular, hollow tabular, or solid tabular shape, and therein is provided the coating film composed of the first protective layer and the second protective layer to form heat exchanger 20 according to the present invention.

[Surface Treatment Method]

The surface treatment method according to the present invention is a surface treatment method including in the order of: a surface conditioning step of rendering a surface of an aluminum or aluminum alloy substrate into a state suitable for formation of a conversion coating film, a water-rinsing step, a step of forming a first protective layer made of the conversion coating film on the surface of the aluminum or aluminum alloy substrate, a water-rinsing step, a step of forming a second protective layer as an organic coating film on the first protective layer, and a drying step. Additionally, in the surface treatment method, the first protective layer is formed from a conversion treatment liquid including vanadium and at least one or more types of metals selected from titanium, zirconium, and hafnium, and the second protective layer is formed from a composition including (1) a chitosan derivative and a solubilizing agent, (2) a modified polyvinyl alcohol obtained by graft polymerization of a hydrophilic polymer to a side chain of polyvinyl alcohol, and (3) a water-soluble crosslinking agent. In the surface treatment method according to the present invention thus formed, the aluminum or aluminum alloy material and the heat exchanger according to the present invention described above can be efficiently obtained with stable quality.

Hereinafter, each of the steps will be described in detail.

(Surface Conditioning Step)

The surface conditioning step is performed to remove contamination, a nonuniform aluminum oxide film, a flux and the like present on the surface of the aluminum or aluminum alloy substrate to obtain a clean surface suitable for the formation of the conversion coating film (the first protective layer) at a subsequent step. As a surface conditioning liquid, there are used at least one or more types of substances selected from water, nitric acid, sulfuric acid, fluoric acid, sodium hydroxide, and potassium hydroxide. Examples of treatment manners that can be performed with these surface conditioning liquid include spraying and dipping.

A temperature of the surface conditioning liquid is preferably 10 to 70° C. If the temperature of the surface conditioning liquid is lower than 10° C., sufficient surface cleaning is not performed, so that it may be impossible to obtain a surface suitable for the formation of an intended conversion coating film. In addition, if the temperature of the surface conditioning liquid is higher than 70° C., a surface conditioning treatment apparatus may cause corrosion or scattering of mist of the surface conditioning liquid may worsen work environment.

Surface conditioning time is preferably 5 to 600 seconds. If the surface conditioning time is shorter than 5 seconds, sufficient surface cleaning is not performed and thus it may be impossible to obtain a surface suitable for the formation of an intended conversion coating film. In addition, if the surface conditioning time is longer than 600 seconds, an alloy component included in the aluminum alloy substrate may be significantly segregated on the surface, which may make it impossible to obtain a surface suitable for the formation of an intended conversion coating film.

(First Protective Layer Formation Step)

The first protective layer formation step is a conversion treatment step of forming the first protective layer as the conversion coating film mainly providing excellent corrosion resistance to the surface of the aluminum or aluminum alloy substrate cleaned at the surface conditioning step.

The formation of the first protective layer is performed by bringing the composition for forming a first protective layer including a vanadium compound and any one or two or more compounds selected from a titanium compound, a zirconium compound, and a hafnium compound into contact with the aluminum or aluminum alloy substrate. Examples of the vanadium compound to be used include one or two or more of sodium metavanadate, potassium metavanadate, ammonium metavanadate, sodium vanadate, potassium vanadate, ammonium vanadate, vanadyl sulfate, vanadium oxysulfate, vanadyl acetylacetonate, and vanadium oxyoxalate. In addition, examples of the titanium compound to be used include one or two or more of $TiCl_4$, $Ti(SO_4)_2$, $TiOSO_4$, $Ti(NO_3)$, $TiO(NO_3)_2$, $TiO_2OC_2O_4$, $H_2TiF_6$, salts of $H_2TiF_6$, $TiO_2$, and $TiF_4$. In addition, examples of the zirconium compound to be used include one or two or more of $ZrCl_4$, $ZrOCl_2$, $Zr(SO_4)_2$, $ZrOSO_4$, $Zr(NO_3)_4$, $ZrO(NO_3)_2$, $H_2ZrF_6$, salts of $H_2ZrF_6$, $ZrO_2$, $ZrOBr_2$, and $ZrF_4$. Additionally, examples of the hafnium compound to be used include one or two or more of $HfCl_4$, $Hf(SO_4)_2$, $Hf(NO_3)$, $HfO_2OC_2O_4$, $H_2HfF_6$, salts of $H_2HfF_6$, $HfO_2$, and $HfF_4$.

To the composition for forming the first protective layer, an oxidizing agent or a reducing agent may be added. Examples of the oxidizing agent or the reducing agent include $HClO_3$, $HBrO_3$, $HNO_3$, $HNO_2$, $HMnO_4$, $HVO_3$, $H_2O_2$, $H_2WO_4$, $H_2MoO_4$, peroxides, peroxo compounds, hydroxylamines such as $NH_2OH$, $(NH_2OH)_2 \cdot H_2SO_4$, $(NH_2OH)_3 \cdot H_3PO_4$, $NH_2OH \cdot HCl$, hydrazine, and sulfite. Additionally, to the composition for forming the first protective layer, there can also be added one or two or more surfactants selected from nonionic surfactants, anionic surfactants, and cationic surfactants.

The blending amount of the vanadium compound in the first protective layer forming composition is adjusted such that the coating weight of vanadium in the obtained first protective layer is 0.3 to 200 mg/m$^2$. In addition, the blending amount of the at least one or more types of compounds selected from a titanium compound, a zirconium compound, and a hafnium compound is also adjusted such that the total coating weight of the respective metal components in the obtained first protective layer is 0.1 to 5 in mole ratio when the coating weight of vanadium is 1.

A treatment temperature for the first protective layer forming composition is preferably 20 to 80° C. If the treatment temperature is lower than 20° C., sufficient conversion reaction does not proceed and thus an intended first protective layer may not be obtainable. In addition, if the treatment temperature is higher than 80° C., the treatment liquid is dried and thereby powdery coating occurs in a drain interval between first protective layer formation step and water-rinsing step, whereby adhesiveness with the second protective layer may be lost.

A treatment time for the first protective layer forming composition is preferably 10 to 600 seconds. If the treatment time is shorter than 10 seconds, sufficient conversion reaction does not proceed, so that an intended first protective layer may not be obtainable. In addition, if the treatment time is longer than 600 seconds, productivity decreases and there is observed no advantageous effect that is worth it.

(Second Protective Layer Application Step)

The second protective layer application step is a treatment step of applying the second protective layer as the organic coating film that mainly provides excellent antibacterial properties, deodorant properties, and hydrophilicity onto the first protective layer.

The composition for forming the second protective layer uses a treatment liquid composed of the composition described in the above description section of the aluminum or aluminum alloy material. The treatment liquid is preferably an aqueous solution including the constituent components of the second protective layer. Additionally, examples of treatment manners that allow the application of the second protective layer include spraying, dipping, and roll coating.

The treatment liquid for applying the second protective layer is adjusted such that the dry mass of the second protective layer is 0.05 to 6.0 g/m$^2$. Additionally, the treatment liquid for applying the second protective layer is adjusted such that a total of the compounds (1) to (3) contained in the obtained entire second protective layer is 50% by mass or more in terms of solid content. More specifically, the treatment liquid for application of the second protective layer is adjusted such that the mass ratios, in terms of solid content, of the respective compounds (1) to (3) contained in the second protective layer are $(1)/\{(1)+(2)+(3)\}=0.1$ to 0.8, $(2)/\{(1)+(2)+(3)\}=0.1$ to 0.6, and $(3)/\{(1)+(2)+(3)\}=0.05$ to 0.3.

Regarding the treatment liquid having the dry mass and the mass ratios in terms of solid content of the applied second protective layer set within the above ranges, a solid content concentration of an aqueous resin included in the treatment liquid is preferably 0.5 to 20% by mass. If the solid content concentration of the aqueous resin is smaller than 0.5% by mass, application unevenness occurs on the surface of the aluminum or aluminum alloy substrate, so that coating by the second protective layer may not be sufficiently obtainable. In addition, if the solid content concentration thereof is larger than 20% by mass, viscosity of the treatment liquid increases and thus, the liquid may not be sufficiently evenly applied on the aluminum or aluminum alloy substrate.

(Drying Step)

Drying temperature at the drying step is preferably 120 to 220° C. If the drying temperature is lower than 120° C., crosslinking of the second protective layer is not sufficiently performed, and thus, hydrophilicity, antibacterial properties, and deodorant properties may be deteriorated. Additionally, if the drying temperature is higher than 220° C., the resin component of the second protective layer decomposes and hydrophilicity may be lost. Furthermore, drying time is preferably 0.5 to 120 minutes. If the drying time is shorter than 0.5 minutes, crosslinking of the second protective layer is not sufficiently obtained, so that hydrophilicity, antibacterial properties, and deodorant properties may be deteriorated. In addition, if the drying time is longer than 120 minutes, the resin component of the second protective layer decomposes and hydrophilicity may be lost.

(Water Rinsing Step)

The water-rinsing step is performed after the surface conditioning step of rendering the surface of the aluminum or aluminum alloy substrate into a state suitable for the formation of a conversion coating film and after the formation of the first protective layer composed of the conversion coating film on the surface of the aluminum or aluminum alloy substrate. The water-rinsing step is not specifically restricted, and various water-rinsing means such as showering and dipping can be used.

EXAMPLES

Hereinafter, a more detailed description will be given of the aluminum or aluminum alloy material having a surface treatment coating film and the surface treatment method according to the present invention, with reference to Examples and Comparative Examples. The present invention is not restricted to the Examples below. In the description below, the expression "heat exchanger made of aluminum and aluminum alloy" means that the heat exchanger includes a part made of aluminum and a part made of aluminum alloy.

Example 1

A heat exchanger made of aluminum and aluminum alloy (see FIG. 2) was prepared as a workpiece. The workpiece was dipped in a 6% nitric acid solution at 10° C. for 120 seconds to perform surface conditioning. After the surface conditioning, the workpiece was water-rinsed by immersion. Next, there was used a treatment liquid having a pH of 3.2 containing ammonium metavanadate (V:150 mg/L) and fluorotitanic acid (Ti:50 mg/L). The treatment liquid was heated to 70° C. and then the workpiece was dipped in the liquid for 60 seconds. In a first protective layer formed on a surface of the workpiece, a coating weight of vanadium was 100 mg/m$^2$ and a coating weight of titanium was 94 mg/m$^2$, in which a mole ratio of Ti/V was 1.0. After the treatment, the workpiece was water-rinsed by immersion.

Next, there was used a treatment liquid having a solid content concentration of 3.0% by mass. The treatment liquid contained (1) a glycerylated chitosan/butanetetracarboxylic acid (mass ratio: 1.0) in an amount of 0.24% by mass in terms of solid content, (2) a polyoxyalkylene ether-modified polyvinyl alcohol in an amount of 1.45% by mass in terms of solid content, and (3) a phosphonobutane tricarboxylic acid in an amount of 0.73% by mass in terms of solid content, and further contained a polyvinyl alcohol having a saponification degree of 95 to 100% in an amount of 0.52% by mass in terms of solid content and a nonionic surfactant (NEWPOL PE-62 manufactured by Sanyo Chemical Industries, Ltd) in an amount of 0.06% by mass in terms of solid content. In the treatment liquid at room temperature (approximately 25° C.; hereinafter the same), the workpiece with the first protective layer formed thereon was dipped for 2 seconds. A coating layer after the treatment was subjected to conditioning by air blow such that an amount of coating was 16.7 mL/m$^2$. Then, the workpiece was dried in a drying oven for 20 minutes at a drying temperature of 160° C. to form a second protective layer. The obtained second protective layer had a dry mass of 0.50 g/m$^2$; the total $\{(1)+(2)+(3)\}$ of the compounds (1) to (3) contained in the second protective layer was 80.7% by mass in terms of solid content; and solid content mass ratios of the respective compounds (1) to (3) were $(1)/\{(1)+(2)+(3)\}=0.10$, $(2)/\{(1)+(2)+(3)\}=0.60$, and $(3)/\{(1)+(2)+(3)\}=0.3$. In this manner, a heat exchanger of Example 1 was prepared.

Example 2

As a workpiece, there was prepared a heat exchanger made of aluminum and aluminum alloy. The workpiece was dipped in a 5% potassium hydroxide solution at 40° C. for 60 seconds to perform surface conditioning. After the surface conditioning, the workpiece was water-rinsed by immersion. Next, there was used a treatment liquid having a pH of 3.8 containing ammonium metavanadate (V: 150 mg/L) and fluorozirconic acid (Zr: 100 mg/L). The treatment liquid was heated to 65° C. and then the workpiece was dipped in the liquid for 40 seconds. In a first protective layer formed on a surface of the workpiece, the coating weight of vanadium was 50 mg/m$^2$ and the coating weight of zirconium was 143 mg/m$^2$, in which a mole ratio of Zr/V was 1.6. After the treatment, the workpiece was water-rinsed by immersion.

Next, there was used a treatment liquid having a solid content concentration of 4.0% by mass. The treatment liquid contained (1) a glycerylated chitosan/citric acid (mass ratio: 0.8) in an amount of 1.45% by mass in terms of solid content, (2) a polyoxyalkylene ether-modified polyvinyl alcohol in an amount of 1.30% by mass in terms of solid content, and (3) a nitrilotrimethylene phosphonic acid in an amount of 0.14% by mass in terms of solid content, and further contained a polyvinyl alcohol having the saponification degree of 95 to 100% in an amount of 1.11% by mass in terms of solid content. In the treatment liquid at room temperature, the workpiece with the first protective layer formed thereon was dipped for 20 seconds. A coating layer after the treatment was subjected to conditioning by air blow such that the amount of coating was 12.5 mL/m$^2$. Then, the workpiece was dried in the drying oven for 0.5 minutes at a drying temperature of 220° C. to form a second protective layer. The obtained second protective layer had the dry mass of 0.50 g/m$^2$; the total $\{(1)+(2)+(3)\}$ of the compounds (1) to (3) contained in the second protective layer was 72.3% by mass in terms of solid content, and the solid content mass ratios of the respective compounds (1) to (3) were $(1)/\{(1)+(2)+(3)\}=0.50$, $(2)/\{(1)+(2)+(3)\}=0.45$, and $(3)/\{(1)+(2)+(3)\}=0.05$. In this manner, a heat exchanger of Example 2 was prepared.

Example 3

As a workpiece, there was prepared a heat exchanger made of aluminum and aluminum alloy. The workpiece was dipped in water at 70° C. for 5 seconds to perform surface conditioning. After the surface conditioning, the workpiece was water-rinsed by immersion. Next, there was used a treatment liquid having a pH of 3.5 containing ammonium vanadate (V: 40 mg/L), fluorotitanic acid (Ti: 40 mg/L), and fluorozirconic acid (Zr: 200 mg/L). The treatment liquid was heated to 20° C. and then the workpiece was dipped in the liquid for 10 seconds. In a first protective layer formed on the surface of the workpiece, the coating weight of vanadium was 2 mg/m$^2$, the coating weight of titanium was 7 mg/m$^2$, and the coating weight of zirconium was 4.6 mg/m$^2$, in which a mole ratio of (Ti+Zr)/V was 5.0. After the treatment, the workpiece was water-rinsed by immersion.

Next, there was used a treatment liquid having a solid content concentration of 7.0% by mass. The treatment liquid contained (1) a polyoxyalkylene ether-modified chitosan/butanetetracarboxylic acid (mass ratio: 1) in an amount of 2.42% by mass in terms of solid content, (2) a polyoxyalkylene ether-modified polyvinyl alcohol in an amount of 1.61% by mass in terms of solid content, and (3) an ethylenediamine tetramethylene phosphonic acid in an amount of 1.35% by mass in terms of solid content, and further contained a polyvinyl alcohol having a saponification degree of 85 to 90% in an amount of 1.52% by mass in terms of solid content and a nonionic surfactant (NOIGEN XL-60 manufactured by Dai-ichi Kogyo Seiyaku Co., Ltd.) in an amount of 0.10% by mass in terms of solid content. In the treatment liquid at room temperature, the workpiece with the first protective layer formed thereon was dipped for 10 seconds. A coating layer after the treatment was subjected to conditioning by air blow such that the amount of coating was 21.4 mL/m$^2$. Then, the workpiece was dried in the drying oven for 15 minutes at a drying temperature of 150° C. to form a second protective layer. The obtained second protective layer had a dry mass of 1.50 g/m$^2$; the total $\{(1)+(2)+(3)\}$ of the compounds (1) to (3) contained in the second protective layer was 76.9% by mass in terms of solid content, and the solid content mass ratios of the respective compounds (1) to (3) were (1)/$\{(1)+(2)+(3)\}$=0.45, (2)/$\{(1)+(2)+(3)\}$=0.30, and (3)/$\{(1)+(2)+(3)\}$=0.25. In this manner, a heat exchanger of Example 3 was prepared.

Example 4

As a workpiece, there was prepared a heat exchanger made of aluminum and aluminum alloy. The workpiece was dipped in a 0.2% nitric acid solution at 40° C. for 600 seconds to perform surface conditioning. After the surface conditioning, the workpiece was water-rinsed by immersion. Next, there was used a treatment liquid having the pH of 3.5 containing ammonium metavanadate (V: 150 mg/L), fluorotitanic acid (Ti: 50 mg/L), fluorozirconic acid (Zr: 200 mg/L), and hydrofluoric acid solution of Hf (Hf: 50 mg/L). The treatment liquid was heated to 30° C. and then the workpiece was dipped in the liquid for 600 seconds. In a first protective layer formed on the surface of the workpiece, the coating weight of vanadium was 20 mg/m$^2$, the coating weight of titanium was 52 mg/m$^2$, the coating weight of zirconium was 41 mg/m$^2$, and the coating weight of hafnium was 36 mg/m$^2$, in which a mole ratio of (Ti+Zr+Hf)/V was 4.4. After the treatment, the workpiece was water-rinsed by immersion.

Next, there was used a treatment liquid having a solid content concentration of 9.0% by mass. The treatment liquid contained (1) a polyoxyalkylene ether-modified chitosan/citric acid (mass ratio: 0.8) in an amount of 4.28% by mass in terms of solid content, (2) a polyoxyalkylene ether-modified polyvinyl alcohol in an amount of 1.65% by mass in terms of solid content, and (3) a phytic acid in an amount of 0.66% by mass in terms of solid content, and further contained a polyvinyl alcohol having the saponification degree of 95 to 100% in an amount of 2.21% by mass in terms of solid content and the nonionic surfactant (NEWPOL PE-62 manufactured by Sanyo Chemical Industries, Ltd) in an amount of 0.20% by mass in terms of solid content. In the treatment liquid at room temperature, the workpiece with the first protective layer formed thereon was dipped for 2 seconds. A coating layer after the treatment was subjected to conditioning by air blow such that the amount of coating was 22.2 mL/m$^2$. Then, the workpiece was dried in the drying oven for 120 minutes at a drying temperature of 120° C. to form a second protective layer. The obtained second protective layer had a dry mass of 2.00 g/m$^2$; the total $\{(1)+(2)+(3)\}$ of the compounds (1) to (3) contained in the second protective layer was 73.2% by mass in terms of solid content, and the solid content mass ratios of the respective compounds (1) to (3) were (1)/$\{(1)+(2)+(3)\}$=0.65, (2)/$\{(1)+(2)+(3)\}$=0.25, and (3)/$\{(1)+(2)+(3)\}$=0.10. In this manner, a heat exchanger of Example 4 was prepared.

Example 5

As a workpiece, there was prepared a heat exchanger made of aluminum and aluminum alloy. The workpiece was dipped in a 3% sulfuric acid solution at 60° C. for 20 seconds to perform surface conditioning. After the surface conditioning, the workpiece was water-rinsed by immersion. Next, there was used a treatment liquid having the pH of 3.5 containing ammonium metavanadate (V: 150 mg/L), fluorotitanic acid (Ti: 40 mg/L), and fluorozirconic acid (Zr: 50 mg/L). In the treatment liquid heated to 65° C., the workpiece was dipped for 50 seconds. In a first protective layer formed on the surface of the workpiece, the coating weight of vanadium was 80 mg/m$^2$, the coating weight of Ti was 65 mg/m$^2$, and the coating weight of Zr was 91 mg/m$^2$, in which the mole ratio of (Ti+Zr)/V was 1.5. After the treatment, the workpiece was water-rinsed by immersion.

Next, there was used a treatment liquid having a solid content concentration of 2.0% by mass. The treatment liquid contained (1) a glycerylated chitosan/butanetetracarboxylic acid (mass ratio: 2) in an amount of 1.04% by mass in terms of solid content, (2) a polyoxyalkylene ether-modified polyvinyl alcohol in an amount of 0.20% by mass in terms of solid content, and (3) an ethylenediamine tetramethylene phosphoric acid in an amount of 0.06% by mass in terms of solid content, and further contained a polyvinyl alcohol having the saponification degree of 95 to 100% in an amount of 0.70% by mass in terms of solid content. In the treatment liquid at room temperature, the workpiece with the first protective layer formed thereon was dipped for 30 seconds. A coating layer after the treatment was subjected to conditioning by air blow such that the amount of coating was 15.0 mL/m$^2$. Then, the workpiece was dried in the drying oven for 40 minutes at the drying temperature of 150° C. to form a second protective layer. The obtained second protective layer had a dry mass of 0.30 g/m$^2$; the total $\{(1)+(2)+(3)\}$ of the compounds (1) to (3) contained in the second protective layer was 65.0% by mass in terms of solid content; and the solid content mass ratios of the respective compounds (1) to (3) were (1)/$\{(1)+(2)+(3)\}$=0.80, (2)/$\{(1)+(2)+(3)\}$=0.15, and (3)/$\{(1)+(2)+(3)\}$=0.05. In this manner, a heat exchanger of Example 5 was prepared.

Example 6

As a workpiece, there was prepared a heat exchanger made of aluminum and aluminum alloy. The workpiece was dipped in a 10° C. solution containing 5% nitric acid and 0.1% hydrofluoric acid for 30 seconds to perform surface conditioning. After the surface conditioning, the workpiece was water-rinsed by immersion. Next, there was used a treatment liquid having a pH of 4.2 containing ammonium metavanadate (V: 250 mg/L), fluorotitanic acid (Ti: 20 mg/L), and fluorozirconic acid (Zr: 30 mg/L). In the treatment liquid heated to 80° C., the workpiece was dipped for 60 seconds. In a first protective layer formed on the surface of the workpiece, the coating weight of vanadium was 120 mg/m$^2$, the coating weight of Ti was 92 mg/m$^2$, and the coating weight of Zr was 82 mg/m$^2$, in which the mole ratio of (Ti+Zr)/V was 1.2. After the treatment, the workpiece was water-rinsed by immersion.

Next, there was used a treatment liquid having the solid content concentration of 3.0% by mass. The treatment liquid contained (1) a glycerylated chitosan/citric acid (mass ratio: 0.8) in an amount of 2.10% by mass in terms of solid content, (2) a polyvinylpyrrolidone-modified polyvinyl alcohol in an amount of 0.30% by mass in terms of solid content, and (3) a phosphonobutane tricarboxylic acid in an amount of 0.60% by mass in terms of solid content. In the treatment liquid at room temperature, the workpiece with the first protective layer formed thereon was dipped for 2 seconds. A coating layer after the treatment was subjected to conditioning by air blow such that the amount of coating was 23.3 mL/m$^2$. Then, the workpiece was dried in the drying oven for 20 minutes at the drying temperature of 160° C. to form a second protective layer. The obtained second protective layer had a dry mass of 0.70 g/m$^2$; the total $\{(1)+(2)+(3)\}$ of the compounds (1) to (3) contained in the second protective layer was 100% by mass in terms of solid content; and the solid content mass ratios of the respective compounds (1) to (3) were $(1)/\{(1)+(2)+(3)\}=0.70$, $(2)/\{(1)+(2)+(3)\}=0.10$, and $(3)/\{(1)+(2)+(3)\}=0.20$. In this manner, a heat exchanger of Example 6 was prepared.

Example 7

As a workpiece, there was prepared a heat exchanger made of aluminum and aluminum alloy. The workpiece was dipped in a 1% nitric acid solution at 35° C. for 100 seconds to perform surface conditioning. After the surface conditioning, the workpiece was water-rinsed by immersion. Next, there was used a treatment liquid having the pH of 3.5 containing vanadyl sulfate (V: 300 mg/L) and fluorotitanic acid (Ti: 40 mg/L). The treatment liquid was heated to 70° C. and then the workpiece was dipped in the liquid for 120 seconds. In a first protective layer formed on the surface of the workpiece, the coating weight of vanadium was 200 mg/m$^2$ and the coating weight of Ti was 94 mg/m$^2$, in which the mole ratio of Ti/V was 0.5. After the treatment, the workpiece was water-rinsed by immersion.

Next, there was used a treatment liquid having the solid content concentration of 7.0% by mass. The treatment liquid contained (1) a polyoxyalkylene ether-modified chitosan/butanetetracarboxylic acid (mass ratio: 1) in an amount of 3.53% by mass in terms of solid content, (2) a polyvinylpyrrolidone-modified polyvinyl alcohol in an amount of 1.77% by mass in terms of solid content, and (3) an ethylenediamine tetramethylene phosphonic acid in an amount of 0.59% by mass in terms of solid content, and further contained a polyvinyl alcohol having the saponification degree of 85 to 95% in an amount of 1.02% by mass in terms of solid content and a nonionic surfactant (NOIGEN XL-100 manufactured by Daiichi Kogyo Seiyaku Co., Ltd.) in an amount of 0.09% by mass in terms of solid content. In the treatment liquid at room temperature, the workpiece with the first protective layer formed thereon was dipped for 20 seconds. A coating layer after the treatment was subjected to conditioning by air blow such that the amount of coating was 14.3 mL/m$^2$. Then, the workpiece was dried in the drying oven for 30 minutes at a drying temperature of 140° C. to form a second protective layer. The obtained second protective layer had a dry mass of 1.00 g/m$^2$; the total $\{(1)+(2)+(3)\}$ of the compounds (1) to (3) contained in the second protective layer was 84.1% by mass in terms of solid content, and the solid content mass ratios of the respective compounds (1) to (3) were $(1)/\{(1)+(2)+(3)\}=0.60$, $(2)/\{(1)+(2)+(3)\}=0.30$, and $(3)/\{(1)+(2)+(3)\}=0.10$. In this manner, a heat exchanger of Example 7 was prepared.

Example 8

As a workpiece, there was prepared a heat exchanger made of aluminum and aluminum alloy. The workpiece was dipped in a 1% sodium hydroxide solution at 50° C. for 15 seconds to perform surface conditioning. After the surface conditioning, the workpiece was water-rinsed by immersion. Next, there was used a treatment liquid having a pH of 4.0 containing ammonium metavanadate (V: 100 mg/L) and fluorotitanic acid (Ti: 20 mg/L). The treatment liquid was heated to 65° C. and then the workpiece was dipped in the liquid for 60 seconds. In a first protective layer formed on the surface of the workpiece, the coating weight of vanadium was 20 mg/m$^2$ and the coating weight of Ti was 38 mg/m$^2$, in which the mole ratio of Ti/V was 2.0. After the treatment, the workpiece was water-rinsed by immersion.

Next, there was used a treatment liquid having a solid content concentration of 0.5% by mass. The treatment liquid contained (1) a glycerylated chitosan/citric acid (mass ratio: 0.8) in an amount of 0.25% by mass in terms of solid content, (2) a polyvinylpyrrolidone-modified polyvinyl alcohol in an amount of 0.14% by mass in terms of solid content, and (3) a nitrilotrimethylene phosphoric acid in an amount of 0.07% by mass in terms of solid content, and further contained the nonionic surfactant (NEWPOL PE-62 manufactured by Sanyo Chemical Industries, Ltd) in an amount of 0.05% by mass in terms of solid content. In the treatment liquid at room temperature, the workpiece with the first protective layer formed thereon was dipped for 40 seconds. A coating layer after the treatment was subjected to conditioning by air blow such that the amount of coating was 10.0 mL/m$^2$. Then, the workpiece was dried in the drying oven for 30 minutes at the drying temperature of 150° C. to form a second protective layer. The obtained second protective layer had a dry mass of 0.05 g/m$^2$; the total $\{(1)+(2)+(3)\}$ of the compounds (1) to (3) contained in the second protective layer was 90.0% by mass in terms of solid content; and the solid content mass ratios of the respective compounds (1) to (3) were $(1)/\{(1)+(2)+(3)\}=0.55$, $(2)/\{(1)+(2)+(3)\}=0.3$, and $(3)/\{(1)+(2)+(3)\}=0.15$. In this manner, a heat exchanger of Example 8 was prepared.

Example 9

As a workpiece, there was prepared a heat exchanger made of aluminum and aluminum alloy. The workpiece was dipped in a 3% nitric acid solution at 40° C. for 60 seconds to perform surface conditioning. After the surface conditioning, the workpiece was water-rinsed by immersion. Next, there was used a treatment liquid having the pH of 3.5 containing vanadyl sulfate (V: 150 mg/L) and fluorozirconic acid (Zr: 50 mg/L). The treatment liquid was heated to 70° C. and then the workpiece was dipped in the liquid for 40 seconds, In a first protective layer formed on the surface of the workpiece, the coating weight of vanadium was 20 mg/m² and the coating weight of Zr was 3.6 mg/m², in which the mole ratio of Zr/V was 0.1. After the treatment, the workpiece was water-rinsed by immersion.

Next, there was used a treatment liquid having the solid content concentration of 4.0% by mass. The treatment liquid contained (1) a glycerylated chitosan/butanetetracarboxylic acid (mass ratio: 2) in an amount of 1.82% by mass in terms of solid content, (2) a polyvinylpyrrolidone-modified polyvinyl alcohol in an amount of 0.52% by mass in terms of solid content, and (3) hydroxyethylidene diphosphonic acid in an amount of 0.26% by mass in terms of solid content, and further contained a polyvinyl alcohol having the saponification degree of 95 to 100% in an amount of 1.32% by mass in terms of solid content and the nonionic surfactant (NOIGEN XL-60 manufactured by Dai-ichi Kogyo Seiyaku Co., Ltd.) in an amount of 0.08% by mass in terms of solid content. In the treatment liquid at room temperature, the workpiece with the first protective layer formed thereon was dipped for 20 seconds. A coating layer after the treatment was subjected to conditioning by air blow such that the amount of coating was 25.0 mL/m². Then, the workpiece was dried in the drying oven for 10 minutes at a drying temperature of 180° C. to form a second protective layer. The obtained second protective layer had the dry mass of 1.00 g/m²; the total $\{(1)+(2)+(3)\}$ of the compounds (1) to (3) contained in the second protective layer was 65.0% by mass in terms of solid content; and the solid content mass ratios of the respective compounds (1) to (3) were $(1)/\{(1)+(2)+(3)\}=0.70$, $(2)/\{(1)+(2)+(3)\}=0.20$, and $(3)/\{(1)+(2)+(3)\}=0.10$. In this manner, a heat exchanger of Example 9 was prepared.

Example 10

As a workpiece, there was prepared a heat exchanger made of aluminum and aluminum alloy. The workpiece was dipped in a 3% sulfuric acid solution at 50° C. for 20 seconds to perform surface conditioning. After the surface conditioning, the workpiece was water-rinsed by immersion. Next, there was used a treatment liquid having a pH of 3.4 containing vanadyl sulfate (V: 150 mg/L), fluorotitanic acid (Ti: 50 mg/L), and fluorozirconic acid (Zr: 70 mg/L). The treatment liquid was heated to 60° C. and then the workpiece was dipped in the liquid for 40 seconds. In a first protective layer formed on the surface of the workpiece, the coating weight of vanadium was 40 mg/m², the coating weight of Ti was 44 mg/m², and the coating weight of Zr was 23 mg/m², in which the mole ratio of (Ti+Zr)/V was 1.5. After the treatment, the workpiece was water-rinsed by immersion.

Next, there was used a treatment liquid having the solid content concentration of 3.0% by mass. The treatment liquid contained (1) a glycerylated chitosan/citric acid (mass ratio: 0.8) in an amount of 0.58% by mass in terms of solid content, (2) a polyvinylpyrrolidone-modified polyvinyl alcohol in an amount of 1.15% by mass in terms of solid content, and (3) a nitrilotrimethylene phosphoric acid in an amount of 0.19% by mass in terms of solid content, and further contained a polyvinyl alcohol having the saponification degree of 95 to 100% in an amount of 0.99% by mass in terms of solid content and the nonionic surfactant (NOIGEN XL-100 manufactured by Dai-ichi Kogyo Seiyaku Co., Ltd.) in the amount of 0.09% by mass in terms of solid content. In the treatment liquid at room temperature, the workpiece with the first protective layer formed thereon was dipped for 30 seconds. A coating layer after the treatment was subjected to conditioning by air blow such that the amount of coating was 23.3 mL/m². Then, the workpiece was dried in the drying oven for 20 minutes at the drying temperature of 160° C. to form a second protective layer. The obtained second protective layer had the dry mass of 0.70 g/m²; the total $\{(1)+(2)+(3)\}$ of the compounds (1) to (3) contained in the second protective layer was 64.0% by mass in terms of solid content; and the solid content mass ratios of the respective compounds (1) to (3) were $(1)/\{(1)+(2)+(3)\}=0.30$, $(2)/\{(1)+(2)+(3)\}=0.60$, and $(3)/\{(1)+(2)+(3)\}=0.10$. In this manner, a heat exchanger of Example 10 was prepared.

Example 11

As a workpiece, there was prepared a heat exchanger made of aluminum and aluminum alloy. The workpiece was dipped in a 0.5% hydrofluoric acid solution at 30° C. for 120 seconds to perform surface conditioning. After the surface conditioning, the workpiece was water-rinsed by immersion. Next, there was used a treatment liquid having the pH of 3.8 containing vanadyl sulfate (V: 100 mg/L), fluorotitanic acid (Ti: 50 mg/L), fluorozirconic acid (Zr: 100 mg/L), and hydrofluoric acid solution of Hf (Hf: 40 mg/L). In the treatment liquid heated to 60° C., the workpiece was dipped for 90 seconds. In a first protective layer formed on the surface of the workpiece, the coating weight of vanadium was 20 mg/m², the coating weight of Ti was 25 mg/m², the coating weight of Zr was 23 mg/m², and the coating weight of Hf was 16 mg/m², in which the mole ratio of (Ti+Zr+Hf)/V was 2.2. After the treatment, the workpiece was water-rinsed by immersion.

Next, there was used a treatment liquid having the solid content concentration of 4.0% by mass. The treatment liquid contained (1) a polyoxyalkylene ether-modified chitosan/butanetetracarboxylic acid (mass ratio: 1) in an amount of 1.34% by mass in terms of solid content, (2) a polyvinylamine-modified polyvinyl alcohol in an amount of 0.75% by mass in terms of solid content, and (3) a hydroxyethylidene diphosphonic acid in an amount of 0.89% by mass in terms of solid content, and further contained a polyvinyl alcohol having the saponification degree of 95 to 100% in an amount of 1.02% by mass in terms of solid content. In the treatment liquid at room temperature, the workpiece with the first protective layer formed thereon was dipped for 20 seconds. A coating layer after the treatment was subjected to conditioning by air blow such that the amount of coating was 12.5 mL/m². Then, the workpiece was dried in the drying oven for 40 minutes at the drying temperature of 150° C. to form a second protective layer. The obtained second protective layer had the dry mass of 0.50 g/m²; the total $\{(1)+(2)+(3)\}$ of the compounds (1) to (3) contained in the second protective layer was 74.5% by mass in terms of solid content; and the solid content mass ratios of the respective compounds (1) to (3) were $(1)/\{(1)+(2)+(3)\}=0.45$, $(2)/\{(1)+(2)+(3)\}=0.25$, and $(3)/\{(1)+(2)+(3)\}=0.30$. In this manner, a heat exchanger of Example 11 was prepared.

Example 12

As a workpiece, there was prepared a heat exchanger made of aluminum and aluminum alloy. The workpiece was dipped in a 5% sodium hydroxide solution at 40° C. for 50 seconds to perform surface conditioning. After the surface conditioning, the workpiece was water-rinsed by immersion. Next, there was used a treatment liquid having the pH of 3.5 containing vanadyl sulfate (V: 100 mg/L) and fluorozirconic acid (Zr: 400 mg/L). In the treatment liquid heated to 70° C., the workpiece was dipped for 100 seconds. In a first protective layer formed on the surface of the workpiece, the coating weight of vanadium was 100 mg/m² and the coating weight of Zr was 90 mg/m², in which the mole ratio of Zr/V was 0.5. After the treatment, the workpiece was water-rinsed by immersion.

Next, there was used a treatment liquid having a solid content concentration of 20.0% by mass. The treatment liquid contained (1) a glycerylated chitosan/citric acid (mass ratio: 0.8) in an amount of 9.20% by mass in terms of solid content, (2) a polyvinylamine-modified polyvinyl alcohol in an amount of 4.60% by mass in terms of solid content, and (3) an ethylenediamine tetramethylene phosphonic acid in an amount of 1.53% by mass in terms of solid content, and further contained a polyvinyl alcohol having the saponification degree of 95 to 100% in an amount of 4.32% by mass in terms of solid content and the nonionic surfactant (NEWPOL PE-62 manufactured by Sanyo Chemical Industries, Ltd) in an amount of 0.35% by mass in terms of solid content. In the treatment liquid at room temperature, the workpiece with the first protective layer formed thereon was dipped for 10 seconds. Coating layer after treatment was subjected to conditioning by air blow such that the amount of coating was 30.0 mL/m². Then, the workpiece was dried in the drying oven for 10 minutes at a drying temperature of 190° C. to form a second protective layer. The obtained second protective layer had a dry mass of 6.00 g/m²; the total $\{(1)+(2)+(3)\}$ of the compounds (1) to (3) contained in the second protective layer was 76.7% by mass in terms of solid content, and the solid content mass ratios of the respective compounds (1) to (3) were $(1)/\{(1)+(2)+(3)\}=0.60$, $(2)/\{(1)+(2)+(3)\}=0.30$, and $(3)/\{(1)+(2)+(3)\}=0.10$. In this manner, a heat exchanger of Example 12 was prepared.

Example 13

As a workpiece, there was prepared a heat exchanger made of aluminum and aluminum alloy. The workpiece was dipped in a 4% sulfuric acid solution at 30° C. for 20 seconds to perform surface conditioning. After the surface conditioning, the workpiece was water-rinsed by immersion. Next, there was used a treatment liquid having a pH of 3.0 containing vanadyl sulfate (V: 40 mg/L) and fluorotitanic acid (Ti: 150 mg/L). In the treatment liquid heated to 30° C., the workpiece was dipped for 10 seconds. In a first protective layer formed on the surface of the workpiece, the coating weight of vanadium was 0.3 mg/m² and the coating weight of Ti was 1.3 mg/m², in which the mole ratio of Ti/V was 4.6. After the treatment, the workpiece was water-rinsed by immersion.

Next, there was used a treatment liquid having a solid content concentration of 10.0% by mass. The treatment liquid contained (1) a polyoxyalkylene ether-modified chitosan/butanetetracarboxylic acid (mass ratio: 1) in an amount of 3.75% by mass in terms of solid content, (2) a polyethyleneimine-modified polyvinyl alcohol in an amount of 0.75% by mass in terms of solid content, and (3) a phytic acid in an amount of 0.50% by mass in terms of solid content, and further contained a polyvinyl alcohol having the saponification degree of 95 to 100% in an amount of 4.89% by mass in terms of solid content and the nonionic surfactant (NEWPOL PE-62 manufactured by Sanyo Chemical Industries, Ltd) in an amount of 0.11% by mass in terms of solid content. In the treatment liquid at room temperature, the workpiece with the first protective layer formed thereon was dipped for 20 seconds. A coating layer after the treatment was subjected to conditioning by air blow such that the amount of coating was 15.0 mL/m². Then, the workpiece was dried in the drying oven for 20 minutes at the drying temperature of 160° C. to form a second protective layer. The obtained second protective layer had the dry mass of 1.50 g/m²; the total $\{(1)+(2)+(3)\}$ of the compounds (1) to (3) contained in the second protective layer was 50.0% by mass in terms of solid content; and the solid content mass ratios of the respective compounds (1) to (3) were $(1)/\{(1)+(2)+(3)\}=0.75$, $(2)/\{(1)+(2)+(3)\}=0.15$, and $(3)/\{(1)+(2)+(3)\}=0.10$. In this manner, a heat exchanger of Example 13 was prepared.

Comparative Example 1

As a workpiece, there was prepared a heat exchanger made of aluminum and aluminum alloy. The workpiece was not subjected to surface conditioning. Then, there was used a treatment liquid having the pH of 3.5 containing ammonium metavanadate (V: 70 mg/L) and fluorozirconic acid (Zr: 200 mg/L). In the treatment liquid heated to 40° C., the workpiece was dipped for 30 seconds. In a first protective layer formed on the surface of the workpiece, the coating weight of vanadium was 0.1 mg/m² and the coating weight of Zr was 0.36 mg/m², in which the mole ratio of Zr/V was 2.0. After the treatment, the workpiece was water-rinsed by immersion.

Next, there was used a treatment liquid having the solid content concentration of 3.0% by mass. The treatment liquid contained (1) a polyoxyalkylene ether-modified chitosan/butanetetracarboxylic acid (mass ratio: 1) in an amount of 1.26% by mass in terms of solid content, (2) a polyethyleneimine-modified polyvinyl alcohol in an amount of 0.63% by mass in terms of solid content, and (3) a phytic acid in an amount of 0.21% by mass in terms of solid content, and further contained a polyvinyl alcohol having the saponification degree of 95 to 100% in an amount of 0.85% by mass in terms of solid content and the nonionic surfactant (NEWPOL PE-62 manufactured by Sanyo Chemical Industries, Ltd) in the amount of 0.05% by mass in terms of solid content. In the treatment liquid at room temperature, the workpiece with the first protective layer formed thereon was dipped for 2 seconds. A coating layer after the treatment was subjected to conditioning by air blow such that the amount of coating was 16.7 mL/m². Then, the workpiece was dried in the drying oven for 40 minutes at the drying temperature of 150° C. to form a second protective layer. The obtained second protective layer had the dry mass of 0.50 g/m²; the total $\{(1)+(2)+(3)\}$ of the compounds (1) to (3) contained in the second protective layer was 70.0% by mass in terms of solid content; and the solid content mass ratios of the respective compounds (1) to (3) were $(1)/\{(1)+(2)+(3)\}=0.60$, $(2)/\{(1)+(2)+(3)\}=0.30$, and $(3)/\{(1)+(2)+(3)\}=0.10$. In this manner, a heat exchanger of Comparative Example 1 was prepared.

Comparative Example 2

As a workpiece, there was prepared a heat exchanger made of aluminum and aluminum alloy. The workpiece was dipped in a 5% nitric acid solution at 40° C. for 40 seconds to perform surface conditioning. After the surface conditioning, the workpiece was water-rinsed by immersion. Next, there was used a treatment liquid having the pH of 3.5 containing fluorotitanic acid (Ti: 50 mg/L), fluorozirconic acid (Zr: 100 mg/L), and hydrofluoric acid solution of Hf (Hf: 50 mg/L). In the treatment liquid heated to 50° C., the workpiece was dipped for 90 seconds. In a first protective layer formed on the surface of the workpiece, the coating weight of titanium was 80 mg/m², the coating weight of zirconium was 36 mg/m², and the coating weight of hafnium was 10 mg/m². After the treatment, the workpiece was water-rinsed by immersion.

Next, there was used a treatment liquid having the solid content concentration of 3.0% by mass. The treatment liquid contained (1) a glycerylated chitosan/citric acid (mass ratio:

0.8) in an amount of 2.20% by mass in terms of solid content, (2) a polyvinylpyrrolidone-modified polyvinyl alcohol in an amount of 0.44% by mass in terms of solid content, and (3) a nitrilotrimethylene phosphonic acid in an amount of 0.29% by mass in terms of solid content, and further contained the nonionic surfactant (NOIGEN XL-100 manufactured by Daiichi Kogyo Seiyaku Co., Ltd.) in an amount of 0.07% by mass in terms of solid content. In the treatment liquid at room temperature, the workpiece with the first protective layer formed thereon was dipped for 30 seconds. A coating layer after the treatment was subjected to conditioning by air blow such that the amount of coating was 16.7 mL/m². Then, the workpiece was dried in the drying oven for 10 minutes at the drying temperature of 160° C. to form a second protective layer. The obtained second protective layer had the dry mass of 0.50 g/m²; the total $\{(1)+(2)+(3)\}$ of the compounds (1) to (3) contained in the second protective layer was 97.7% by mass in terms of solid content; and the solid content mass ratios of the respective compounds (1) to (3) were $(1)/\{(1)+(2)+(3)\}=0.75$, $(2)/\{(1)+(2)+(3)\}=0.15$, and $(3)/\{(1)+(2)+(3)\}=0.10$. In this manner, a heat exchanger of Comparative Example 2 was prepared.

Comparative Example 3

As a workpiece, there was prepared a heat exchanger made of aluminum and aluminum alloy. The workpiece was dipped in a 5% sodium hydroxide solution at 60° C. for 20 seconds to perform surface conditioning. After the surface conditioning, the workpiece was water-rinsed by immersion. Next, there was used a treatment liquid having the pH of 3.5 containing ammonium metavanadate (V: 80 mg/L) and fluorotitanic acid (Ti: 100 mg/L). In the treatment liquid heated to 45° C., the workpiece was dipped for 40 seconds. In a first protective layer formed on the surface of the workpiece, the coating weight of vanadium was 10 mg/m² and the coating weight of titanium was 29 mg/m², in which the mole ratio of Ti/V was 3.1 After the treatment, the workpiece was water-rinsed by immersion.

Next, there was used a treatment liquid having a solid content concentration of 8.0% by mass. The treatment liquid did not contain (1) a chitosan derivative and a solubilizing agent composed of polyvalent carboxylic acid, but contained (2) a polyvinylpyrrolidone-modified polyvinyl alcohol in an amount of 3.35% by mass in terms of solid content and (3) a hydroxyethylidene diphosphonic acid in an amount of 1.43% by mass in terms of solid content, and further contained a polyvinyl alcohol having the saponification degree of 95 to 100% in an amount of 3.22% by mass in terms of solid content. In the treatment liquid at room temperature, the workpiece with the first protective layer formed thereon was dipped for 10 seconds. A coating layer after the treatment was subjected to conditioning by air blow such that the amount of coating was 18.8 mL/m². Then, the workpiece was dried in the drying oven for 20 minutes at the drying temperature of 160° C. to form a second protective layer. The obtained second protective layer had the dry mass of 1.50 g/m²; the total $\{(1)+(2)+(3)\}$ of the compounds (1) to (3) contained in the second protective layer was 59.8% by mass in terms of solid content; and the solid content mass ratios of the respective compounds (1) to (3) were $(1)/\{(1)+(2)+(3)\}=0.00$, $(2)/\{(1)+(2)+(3)\}=0.70$, and $(3)/\{(1)+(2)+(3)\}=0.30$. In this manner, a heat exchanger of Comparative Example 3 was prepared.

Comparative Example 4

As a workpiece, there was prepared a heat exchanger made of aluminum and aluminum alloy. The workpiece was dipped in a 40° C. solution containing 2% nitric acid and 0.1% hydrofluoric acid for 30 seconds to perform surface conditioning. After the surface conditioning, the workpiece was water-rinsed by immersion. Next, there was used a treatment liquid having the pH of 3.8 containing vanadyl sulfate (V: 150 mg/L) and fluorozirconic acid (Zr: 80 mg/L). In the treatment liquid heated to 60° C., the workpiece was dipped for 60 seconds. In a first protective layer formed on the surface of the workpiece, the coating weight of vanadium was 55 mg/m² and the coating weight of zirconium was 79 mg/m², in which the mole ratio of Zr/V was 0.8. After the treatment, the workpiece was water-rinsed by immersion.

Next, there was used a treatment liquid having a solid content concentration of 15.0% by mass. The treatment liquid contained (1) a glycerylated chitosan/butanetetracarboxylic acid (mass ratio: 2) in an amount of 7.73% by mass in terms of solid content, without containing (2) a modified polyvinyl alcohol obtained by graft polymerization of a hydrophilic polymer to a side chain of polyvinyl alcohol, and (3) an ethylenediamine tetramethylene phosphonic acid in an amount of 2.58% by mass in terms of solid content, and further contained a polyvinyl alcohol having the saponification degree of 95 to 100% in an amount of 4.50% by mass in terms of solid content and the nonionic surfactant (NEWPOL PE-62 manufactured by Sanyo Chemical Industries, Ltd) in an amount of 0.20% by mass in terms of solid content. In the treatment liquid at room temperature, the workpiece with the first protective layer formed thereon was dipped for 40 seconds. A coating layer after the treatment was subjected to conditioning by air blow such that the amount of coating was 23.3 mL/m². Then, the workpiece was dried in the drying oven for 30 minutes at the drying temperature of 160° C. to form a second protective layer. The obtained second protective layer had a dry mass of 3.50 g/m²; the total $\{(1)+(2)+(3)\}$ of the compounds (1) to (3) contained in the second protective layer was 68.7% by mass in terms of solid content; and the solid content mass ratios of the respective compounds (1) to (3) were $(1)/\{(1)+(2)+(3)\}=0.75$, $(2)/\{(1)+(2)+(3)\}=0.00$, and $(3)/\{(1)+(2)+(3)\}=0.25$. In this manner, a heat exchanger of Comparative Example 4 was prepared.

Comparative Example 5

As a workpiece, there was prepared a heat exchanger made of aluminum and aluminum alloy. The workpiece was dipped in a 40° C. solution containing 2% nitric acid and 0.1% hydrofluoric acid for 30 seconds to perform surface conditioning. After the surface conditioning, the workpiece was water-rinsed by immersion. Next, there was used a treatment liquid having the pH of 4.0 containing vanadyl sulfate (V: 200 mg/L), fluorotitanic acid (Ti: 70 mg/L), and fluorozirconic acid (Zr: 100 mg/L). In the treatment liquid heated to 70° C., the workpiece was dipped for 60 seconds. In a first protective layer formed on the surface of the workpiece, the coating weight of vanadium was 75 mg/m², the coating weight of titanium was 95 mg/m², and the coating weight of zirconium was 100 mg/m², in which the mole ratio of (Ti+Zr)/V was 2.1. After the treatment, the workpiece was water-rinsed by immersion.

Next, there was used a treatment liquid having the solid content concentration of 20.0% by mass. The treatment liquid contained (1) a polyoxyalkylene ether-modified chitosan/citric acid (mass ratio: 0.8) in an amount of 9.73% by mass in terms of solid content and (2) a polyoxyalkylene ether-modified polyvinyl alcohol in an amount of 4.17% by mass in terms of solid content, but not (3) an organic polyvalent phosphonic acid. The treatment liquid further contained a polyvinyl alcohol having the saponification degree of 95 to 100% in an amount of 6.10% by mass in terms of solid content. In the treatment liquid at room temperature, the workpiece with the first protective layer formed thereon was dipped for 30 seconds. A coating layer after the treatment was subjected to conditioning by air blow such that the amount of coating was 22.5 mL/m². Then, the workpiece was dried in the drying oven for 20 minutes at a drying temperature of 170° C. to form a second protective layer. The obtained second protective layer had a dry mass of 4.50 g/m²; the total {(1)+(2)+(3)} of the compounds (1) to (3) contained in the second protective layer was 69.5% by mass in terms of solid content; and the solid content mass ratios of the respective compounds (1) to (3) were (1)/{(1)+(2)+(3)}=0.70, (2)/{(1)+(2)+(3)}=0.30, and (3)/{(1)+(2)+(3)}=0.00. In this manner, a heat exchanger of Comparative Example 5 was prepared.

Comparative Example 6

As a workpiece, there was prepared a heat exchanger made of aluminum and aluminum alloy was dipped in a 1% nitric acid solution at 35° C. for 20 seconds to perform surface conditioning. After the surface conditioning, the workpiece was water-rinsed by immersion. Next, there was used a treatment liquid having the pH of 4.0 containing vanadyl sulfate (V: 50 mg/L), fluorotitanic acid (Ti: 30 mg/L), and fluorozirconic acid (Zr: 70 mg/L). In the treatment liquid heated to 30° C., the workpiece was dipped for 20 seconds. In a first protective layer formed on the surface of the workpiece, the coating weight of vanadium was 50 mg/m², the coating weight of titanium was 1.9 mg/m², and the coating weight of zirconium was 0.91 mg/m², in which the mole ratio of (Ti+Zr)/V was 0.05. After the treatment, the workpiece was water-rinsed by immersion.

Next, there was used a treatment liquid having the solid content concentration of 3.0% by mass. The treatment liquid contained (1) a polyoxyalkylene ether-modified chitosan/butanetetracarboxylic acid (mass ratio: 1) in an amount of 1.60% by mass in terms of solid content, (2) a polyvinylpyrrolidone-modified polyvinyl alcohol in an amount of 0.87% by mass in terms of solid content, and (3) an ethylenediamine tetramethylene phosphonic acid in an amount of 0.44% by mass in terms of solid content, and further contained the nonionic surfactant (NOIGEN XL-100 manufactured by Daiichi Kogyo Seiyaku Co., Ltd.) in an amount of 0.1% by mass in terms of solid content. In the treatment liquid at room temperature, the workpiece with the first protective layer formed thereon was dipped for 20 seconds. A coating layer after the treatment was subjected to conditioning by air blow such that the amount of coating was 30.0 mL/m². Then, the workpiece was dried in the drying oven for 30 minutes at the drying temperature of 140° C. to form a second protective layer. The obtained second protective layer had a dry mass of 0.90 g/m²; the total {(1)+(2)+(3)} of the compounds (1) to (3) contained in the second protective layer was 96.7% by mass in terms of solid content; and the solid content mass ratios of the respective compounds (1) to (3) were (1)/{(1)+(2)+(3)}=0.55, (2)/{(1)+(2)+(3)}=0.30, and (3)/{(1)+(2)+(3)}=0.15. In this manner, a heat exchanger of Comparative Example 6 was prepared.

Comparative Example 7

As a workpiece, there was prepared a heat exchanger made of aluminum and aluminum alloy. The workpiece was dipped in a 1% sodium hydroxide solution at 50° C. for 15 seconds to perform surface conditioning. After the surface conditioning, the workpiece was water-rinsed by immersion. Next, there was used a treatment liquid having the pH of 4.0 containing ammonium metavanadate (V: 100 mg/L) and fluorotitanic acid (Ti: 50 mg/L). In the treatment liquid heated to 65° C., the workpiece was dipped for 60 seconds. In a first protective layer formed on the surface of the workpiece, the coating weight of vanadium was 20 mg/m² and the coating weight of Ti was 60 mg/m², in which the mole ratio of Ti/V was 3.2. After the treatment, the workpiece was water-rinsed by immersion.

Next, there was used a treatment liquid having a solid content concentration of 6.0% by mass. The treatment liquid contained (1) a glycerylated chitosan/citric acid (mass ratio: 0.8) in an amount of 4.17% by mass in terms of solid content, (2) a polyvinylpyrrolidone-modified polyvinyl alcohol in an amount of 0.49% by mass in terms of solid content, and (3) a nitrilotrimethylene phosphonic acid in an amount of 0.25% by mass in terms of solid content, and further contained a polyvinyl alcohol having the saponification degree of 95 to 100% in an amount of 1.05% by mass in terms of solid content and the nonionic surfactant (NEWPOL PE-62 manufactured by Sanyo Chemical Industries, Ltd) in the amount of 0.05% by mass in terms of solid content. In the treatment liquid at room temperature, the workpiece with the first protective layer formed thereon was dipped for 40 seconds. A coating layer after the treatment was subjected to conditioning by air blow such that the amount of coating was 16.7 mL/m². Then, the workpiece was dried in the drying oven for 30 minutes at the drying temperature of 150° C. to form a second protective layer. The obtained second protective layer had the dry mass of 1.00 g/m²; the total {(1)+(2)+(3)} of the compounds (1) to (3) contained in the second protective layer was 81.7% by mass in terms of solid content; and the solid content mass ratios of the respective compounds (1) to (3) were (1)/{(1)+(2)+(3)}=0.85, (2)/{(1)+(2)+(3)}=0.1, and (3)/{(1)+(2)+(3)}=0.05. In this manner, a heat exchanger of Comparative Example 7 was prepared.

Comparative Example 8

As a workpiece, there was prepared a heat exchanger made of aluminum and aluminum alloy. The workpiece was dipped in a 3% nitric acid solution at 40° C. for 60 seconds to perform surface conditioning. After the surface conditioning, the workpiece was water-rinsed by immersion. Next, there was used a treatment liquid having the pH of 3.5 containing ammonium metavanadate (V: 150 mg/L), fluorotitanic acid (Ti: 50 mg/L), fluorozirconic acid (Zr: 200 mg/L), and hydrofluoric acid solution of Hf (Hf: 50 mg/L). In the treatment liquid at 70° C., the workpiece was dipped for 40 seconds. In a first protective layer formed on the surface of the workpiece, the coating weight of vanadium was 30 mg/m², the coating weight of titanium was 42 mg/m², the coating weight of zirconium was 46 mg/m², and the coating weight of hafnium was 18 mg/m², in which the mole ratio of (Ti+Zr+Hf)/V was 2.5. After the treatment, the workpiece was water-rinsed by immersion.

Next, there was used a treatment liquid having the solid content concentration of 2.0% by mass. The treatment liquid contained (1) a glycerylated chitosan/butanetetracarboxylic acid (mass ratio: 2) in an amount of 0.06% by mass in terms of solid content, (2) a polyvinylpyrrolidone-modified polyvinyl alcohol in an amount of 0.81% by mass in terms of solid content, and (3) a hydroxyethylidene diphosphonic acid in an amount of 0.38% by mass in terms of solid content, and further contained a polyvinyl alcohol having the saponification degree of 95 to 100% in an amount of 0.75% by mass in terms of solid content. In the treatment liquid at room temperature, the workpiece with the first protective layer formed thereon was dipped for 20 seconds. A coating layer after the treatment was subjected to conditioning by air blow such that the amount of coating was 15.0 mL/m$^2$. Then, the workpiece was dried in the drying oven for 10 minutes at the drying temperature of 180° C. to form a second protective layer. The obtained second protective layer had the dry mass of 0.30 g/m$^2$; the total $\{(1)+(2)+(3)\}$ of the compounds (1) to (3) contained in the second protective layer was 62.5% by mass in terms of solid content; and the solid content mass ratios of the respective compounds (1) to (3) were (1)/$\{(1)+(2)+(3)\}$=0.05, (2)/$\{(1)+(2)+(3)\}$=0.65, and (3)/$\{(1)+(2)+(3)\}$=0.30. In this manner, a heat exchanger of Comparative Example 8 was prepared.

Comparative Example 9

As a workpiece, there was prepared a heat exchanger made of aluminum and aluminum alloy. The workpiece was dipped in a 3% sulfuric acid solution at 50° C. for 20 seconds to perform surface conditioning. After the surface conditioning, the workpiece was water-rinsed by immersion. Next, there was used a treatment liquid having the pH of 3.4 containing vanadyl sulfate (V: 70 mg/L) and fluorotitanic acid (Ti: 40 mg/L). In the treatment liquid at 60° C., the workpiece was dipped for 40 seconds. In a first protective layer formed on the surface of the workpiece, the coating weight of vanadium was 25 mg/m$^2$ and the coating weight of Ti was 38 mg/m$^2$, in which the mole ratio of Ti/V was 1.6. After the treatment, the workpiece was water-rinsed by immersion.

Next, there was used a treatment liquid having a solid content concentration of 1.0% by mass. The treatment liquid contained (1) a glycerylated chitosan/citric acid (mass ratio: 0.8) in an amount of 0.45% by mass in terms of solid content, (2) a polyvinylpyrrolidone-modified polyvinyl alcohol in an amount of 0.03% by mass in terms of solid content, and (3) a nitrilotrimethylene phosphonic acid in an amount of 0.12% by mass in terms of solid content, and further contained a polyvinyl alcohol having the saponification degree of 95 to 100% in an amount of 0.40% by mass in terms of solid content. In the treatment liquid at room temperature, the workpiece with the first protective layer formed thereon was dipped for 30 seconds. A coating layer after the treatment was subjected to conditioning by air blow such that the amount of coating was 20.0 mL/m$^2$. Then, the workpiece was dried in the drying oven for 20 minutes at the drying temperature of 160° C. to form a second protective layer. The obtained second protective layer had a dry mass of 0.20 g/m$^2$; the total $\{(1)+(2)+(3)\}$ of the compounds (1) to (3) contained in the second protective layer was 60.0% by mass in terms of solid content; and the solid content mass ratios of the respective compounds (1) to (3) were (1)/$\{(1)+(2)+(3)\}$=0.75, (2)/$\{(1)+(2)+(3)\}$=0.05, and (3)/$\{(1)+(2)+(3)\}$=0.20. In this manner, a heat exchanger of Comparative Example 9 was prepared.

Comparative Example 10

As a workpiece, there was prepared a heat exchanger made of aluminum and aluminum alloy. The workpiece was dipped in a 0.5% hydrofluoric acid solution at 30° C. for 120 seconds to perform surface conditioning. After the surface conditioning, the workpiece was water-rinsed by immersion. Next, there was used a treatment liquid having the pH of 4.2 containing vanadyl sulfate (V: 70 mg/L) and fluorozirconic acid (Zr: 500 mg/L). In the treatment liquid at 60° C., the workpiece was dipped for 90 seconds. In a first protective layer formed on the surface of the workpiece, the coating weight of vanadium was 40 mg/m$^2$ and the coating weight of Zr was 143 mg/m$^2$, in which the mole ratio of Zr/V was 2.0. After the treatment, the workpiece was water-rinsed by immersion.

Next, there was used a treatment liquid having the solid content concentration of 3.0% by mass. The treatment liquid contained (1) a polyoxyalkylene ether-modified chitosan/butanetetracarboxylic acid (mass ratio: 1) in an amount of 0.58% by mass in terms of solid content, (2) a polyvinylamine-modified polyvinyl alcohol in an amount of 1.25% by mass in terms of solid content, and (3) a hydroxyethylidene diphosphonic acid in an amount of 0.10% by mass in terms of solid content, and further contained a polyvinyl alcohol having the saponification degree of 95 to 100% in an amount of 1.00% by mass in terms of solid content and the nonionic surfactant (NEWPOL PE-62 manufactured by Sanyo Chemical Industries, Ltd) in an amount of 0.08% by mass in terms of solid content. In the treatment liquid at room temperature, the workpiece with the first protective layer formed thereon was dipped for 20 seconds. A coating layer after the treatment was subjected to conditioning by air blow such that the amount of coating was 23.3 mL/m$^2$. Then, the workpiece was dried in the drying oven for 40 minutes at the drying temperature of 150° C. to form a second protective layer. The obtained second protective layer had the dry mass of 0.70 g/m$^2$; the total $\{(1)+(2)+(3)\}$ of the compounds (1) to (3) contained in the second protective layer was 64.0% by mass in terms of solid content; and the solid content mass ratios of the respective compounds (1) to (3) were (1)/$\{(1)+(2)+(3)\}$=0.30, (2)/$\{(1)+(2)+(3)\}$=0.65, and (3)/$\{(1)+(2)+(3)\}$=0.05. In this manner, a heat exchanger of Comparative Example 10 was prepared.

Comparative Example 11

As a workpiece, there was prepared a heat exchanger made of aluminum and aluminum alloy. The workpiece was dipped in a 5% sodium hydroxide solution at 40° C. for 50 seconds to perform surface conditioning. After the surface conditioning, the workpiece was water-rinsed by immersion. Next, there was used a treatment liquid having the pH of 3.8 containing vanadyl sulfate (V: 80 mg/L), fluorotitanic acid (Ti: 30 mg/L), and fluorozirconic acid (Zr: 80 mg/L). In the treatment liquid at 70° C., the workpiece was dipped for 50 seconds. In a first protective layer formed on the surface of the workpiece, the coating weight of vanadium was 50 mg/m$^2$, the coating weight of Ti was 28 mg/m$^2$, and the coating weight of Zr was 18 mg/m$^2$, in which the mole ratio of (Ti+Zr)/V was 0.8. After the treatment, the workpiece was water-rinsed by immersion.

Next, there was used a treatment liquid having the solid content concentration of 4.0% by mass. The treatment liquid contained (1) a glycerylated chitosan/citric acid (mass ratio: 0.8) in an amount of 1.92% by mass in terms of solid content, (2) a polyvinylamine-modified polyvinyl alcohol in an amount of 2.00% by mass in terms of solid content, and (3) an ethylenediamine tetramethylene phosphonic acid in an amount of 0.08% by mass in terms of solid content. In the treatment liquid at room temperature, the workpiece with the first protective layer formed thereon was dipped for 10 seconds. A coating layer after the treatment was subjected to conditioning by air blow such that the amount of coating was 12.5 mL/m$^2$. Then, the workpiece was dried in the drying oven for 10 minutes at a drying temperature of 190° C. to form a second protective layer. The obtained second protective layer had the dry mass of 0.50 g/m$^2$; the total $\{(1)+(2)+(3)\}$ of the compounds (1) to (3) contained in the second protective layer was 100% by mass in terms of solid content; and the solid content mass ratios of the respective compounds (1) to (3) were (1)/{(1)+(2)+(3)}=0.48, (2)/{(1)+(2)+(3)}=0.50, and (3)/{(1)+(2)+(3)}=0.02. In this manner, a heat exchanger of Comparative Example 11 was prepared.

Comparative Example 12

As a workpiece, there was prepared a heat exchanger made of aluminum and aluminum alloy. The workpiece was dipped in a 3% nitric acid solution at 50° C. for 20 seconds to perform surface conditioning. After the surface conditioning, the workpiece was water-rinsed by immersion. Next, there was used a treatment liquid having the pH of 3.2 containing vanadyl sulfate (V: 150 mg/L) and fluorotitanic acid (Ti: 100 mg/L). In the treatment liquid at 60° C., the workpiece was dipped for 50 seconds. In a first protective layer formed on the surface of the workpiece, the coating weight of vanadium was 40 mg/m$^2$ and the coating weight of titanium was 83 mg/m$^2$, in which the mole ratio of Ti/V was 2.2. After the treatment, the workpiece was water-rinsed by immersion.

Next, there was used a treatment liquid having a solid content concentration of 0.2% by mass. The treatment liquid contained (1) a glycerylated chitosan/butanetetracarboxylic acid (mass ratio: 2) in an amount of 0.11% by mass in terms of solid content, (2) a polyoxyalkylene ether-modified polyvinyl alcohol in an amount of 0.05% by mass in terms of solid content, and (3) an ethylenediamine tetramethylene phosphonic acid in an amount of 0.02% by mass in terms of solid content, and further contained the nonionic surfactant (NEWPOL PE-62 manufactured by Sanyo Chemical Industries, Ltd) in an amount of 0.02% by mass in terms of solid content. In the treatment liquid at room temperature, the workpiece with the first protective layer formed thereon was dipped for 20 seconds. A coating layer after the treatment was subjected to conditioning by air blow such that an amount of coating was 10.0 mL/m$^2$. Then, the workpiece was dried in the drying oven for 40 minutes at the drying temperature of 150° C. to form a second protective layer. The obtained second protective layer had a dry mass of 0.02 g/m$^2$; the total {(1)+(2)+(3)} of the compounds (1) to (3) contained in the second protective layer was 90.0% by mass in terms of solid content; and the solid content mass ratios of the respective compounds (1) to (3) were (1)/{(1)+(2)+(3)} 0.60, (2)/{(1)+(2)+(3)}=0.30, and (3)/{(1)+(2)+(3)}=0.10. In this manner, a heat exchanger of Comparative Example 12 was prepared.

Comparative Example 13

As a workpiece, there was prepared a heat exchanger made of aluminum and aluminum alloy. The workpiece was dipped in a 3% sulfuric acid solution at 50° C. for 20 seconds to perform surface conditioning. After the surface conditioning, the workpiece was water-rinsed by immersion. Next, there was used a treatment liquid having the pH of 4.0 containing vanadyl sulfate (V: 100 mg/L) and fluorozirconic acid (Zr: 250 mg/L). In the treatment liquid at 70° C., the workpiece was dipped for 60 seconds. In a first protective layer formed on the surface of the workpiece, the coating weight of vanadium was 40 mg/m$^2$ and the coating weight of zirconium was 72 mg/m$^2$, in which the mole ratio of Zr/V was 1.0. After the treatment, the workpiece was water-rinsed by immersion.

Next, there was used a treatment liquid having the solid content concentration of 6.0% by mass. The treatment liquid contained (1) a glycerylated chitosan/citric acid (mass ratio: 0.8) in an amount of 1.20% by mass in terms of solid content, (2) a polyvinylpyrrolidone-modified polyvinyl alcohol in an amount of 0.60% by mass in terms of solid content, and (3) a nitrilotrimethylene phosphonic acid in the amount of 0.60% by mass in terms of solid content, and further contained a polyvinyl alcohol having the saponification degree of 95 to 100% in an amount of 3.50% by mass in terms of solid content. In the treatment liquid at room temperature, the workpiece with the first protective layer formed thereon was dipped for 10 seconds. A coating layer after the treatment was subjected to conditioning by air blow such that the amount of coating was 16.7 mL/m$^2$. Then, the workpiece was dried in the drying oven for 20 minutes at the drying temperature of 160° C. to form a second protective layer. The obtained second protective layer had the dry mass of 1.00 g/m$^2$; the total {(1)+(2)+(3)} of the compounds (1) to (3) contained in the second protective layer was 40.0% by mass in terms of solid content; and the solid content mass ratios of the respective compounds (1) to (3) were (1)/{(1)+(2)+(3)}=0.50, (2)/{(1)+(2)+(3)}=0.25, and (3)/{(1)+(2)+(3)}=0.25. In this manner, a heat exchanger of Comparative Example 13 was prepared.

Comparative Example 14

As a workpiece, there was prepared a heat exchanger made of aluminum and aluminum alloy. The workpiece was dipped in a 2% sodium hydroxide solution at 60° C. for 20 seconds to perform surface conditioning. After the surface conditioning, the workpiece was water-rinsed by immersion. Next, there was used a treatment agent prepared by diluting a zirconium phosphate conversion treatment agent (ALODINE 4040 manufactured by Nihon Parkerizing Co. Ltd) with water at a rate of 20 g/L. In the treatment liquid at 40° C., the workpiece was dipped for 30 seconds to form a first protective layer. After the treatment, the workpiece was water-rinsed by immersion.

Next, there was used a treatment liquid having the solid content concentration of 2% by mass. The treatment liquid contained polyacrylamide in an amount of 0.77% by mass in terms of solid content, a water-soluble nylon (P70 manufactured by Toray, industries, Inc) in an amount of 0.62% by mass in terms of solid content, polyvinylsulfonic acid in an amount of 0.38% by mass in terms of solid content, chromium sulfate in an amount of 0.12% by mass in terms of solid content, 2-thiocyanomethyl benzothiazole in an amount of 0.08% by mass in terms of solid content, and a nonionic surfactant (NOIGEN ET 135 manufactured by Dai-ichi Kogyo Seiyaku Co., Ltd.) in an amount of 0.03% by mass in terms of solid content. In the treatment liquid at room temperature, the workpiece with the first protective layer formed thereon was dipped for 20 seconds. A coating layer after the treatment was subjected to conditioning by air blow such that the amount of coating was 22.5 mL/m$^2$. Then, the workpiece was dried in the drying oven for 20 minutes at the drying temperature of 140° C. to form a second protective layer. The obtained second protective layer had a dry mass of 0.45 g/m$^2$. In this manner, a heat exchanger of Comparative Example 14 was prepared.

Comparative Example 15

As a workpiece, there was prepared a heat exchanger made of aluminum and aluminum alloy. The workpiece was dipped in a 2% sulfuric acid solution at 45° C. for 20 seconds to perform surface conditioning. After the surface conditioning, the workpiece was water-rinsed by immersion. Next, there was used a treatment agent having the pH of 4.0 containing fluorozirconic acid (Zr: 400 mg/L). In the treatment liquid at 60° C., the workpiece was dipped for 50 seconds to form a first protective layer. After the treatment, the workpiece was water-rinsed by immersion.

Next, there was used a water-based treatment liquid having a solid content concentration of 0.94% by mass. The treatment liquid contained a glycerylated chitosan in an amount of 0.3% by mass in terms of solid content, a citric acid in an amount of 0.5% by mass in terms of solid content, a polyethylene glycol (Mw: approximately 20000) in an amount of 0,04% by mass in terms of solid content, and a surfactant (a nonylphenyl/EO (20 moles) adduct) in an amount of 0.1% by mass in terms of solid content. In the treatment liquid at room temperature, the workpiece with the first protective layer formed thereon was dipped for 30 seconds. A coating layer after the treatment was subjected to conditioning by air blow such that the amount of coating was 26.6 mL/m$^2$. Then, the workpiece was dried in the drying oven for 30 minutes at the drying temperature of 180° C. to form a second protective layer. The obtained second protective layer had a dry mass of 0.25 g/m$^2$. In this manner, a heat exchanger of Comparative Example 15 was prepared.

[Evaluation]

The heat exchangers prepared in Examples 1 to 13 and Comparative Examples 1 to 15 were evaluated using the following methods. Table 1 shows the summarized results of Examples 1 to 13 and Comparative Examples 1 to 15.

<Evaluation of Hydrophilicity>

Heat exchanger dipping in running water (water flow rate: 0.5 L/min of deionized water) was performed for 90 hours. Regarding the fin portions before and after running the water, water contact angles after 10 seconds from droplet landing were measured using an automated contact angle meter DM-501 (manufactured by Kyowa Interface Science Co., Ltd), The results were shown in Table 2. In the evaluation criteria of Table 2, the "single circle (good)" indicates that initial contact angle (a contact angle before running the water) was less than 10° and a contact angle after running the water was less than 25°; the "triangle(relatively poor)" indicates that initial contact angle was 10° or more and 20° or less and a contact angle after running the water was 25° or more and 30° or less; and the "cross mark(unacceptable)" indicates that initial contact angle exceeded 20° and a contact angle after running the water exceeded 35°.

<Evaluation of Corrosion Resistance: Salt Spray Test (SST)>

A salt spray test is done according to JIS-2371. The heat exchanger is exposed to the atomized salt solution for 480 hours in a testing device. Rust areas of the heat exchanger after 480 hours were evaluated by external observation. The results were shown in Table 2. In the evaluation criteria of Table 2, the "double circle (excellent)" indicates no color change; the "single circle (good)" indicates that the rate of rust occurrence was less than 10%; the "square (relatively poor)" indicates that the rust occurrence rate was 10% or more and 30% or less; the "triangle (poor)" indicates that rust occurrence rate was more than 30% and 50% or less; and the "cross mark (unacceptable)" indicates that the rust occurrence rate was more than 50%.

<Evaluation of Corrosion Resistance: Humidity Test>

The heat exchanges were placed in a humidity testing apparatus (CT-3 manufactured by Suga Test Instruments Co., Ltd) maintained under a high-temperature and high humidity atmosphere: temperature 50±1° C.; relative humidity 95% or higher to be exposed for 2000 hours so as to evaluate rusty areas after the test from their external appearance. The results were shown in Table 2. In the evaluation criteria of Table 2, the "double circle(excellent)" indicates no color change; the "single circle (good)" indicates that the rust occurrence rate was less than 5%; the "triangle(relatively poor)" indicates that the rust occurrence rate was equal to or more than 5% and 50% or less; and the "cross mark(unacceptable)" indicates that the rust occurrence rate was more than 50%.

<Evaluation of Antibacterial Properties>

The heat exchangers after the 90-hour dipping in running water (water flow rate: 0.5 L/min of deionized water) were dried at 50° C. for 3 hours and cut into a size of 1.5×4×3 cm to prepare evaluation samples. Next, the evaluation samples were wrapped in aluminum foil and exposed in an autoclave at 115° C. for 15 minutes for sterilization. Then, 0.5 mL of nutrient broth (Difco: 16 g/L) was uniformly adhered between the fins using a micropipette and dried in clean bench (sterilized state) for 18 hours to inoculate culture medium in the evaluation samples. Test bacteria were inoculated and cultured in a bouillon culture medium, and then bacterial count was adjusted to a predetermined count. Regarding the adjusted bacterial count, viable count in bacterial suspension was measured by a pour plate culture method to set it as an initial bacterial count. The test bacteria used were three kinds of bacteria: *Bacillus subtilis, Pseudomonas aeruginosa*, and *Staphylococcus aureus*.

Between the fins of the evaluation samples in which culture medium inoculation had been done in advance, 0.2 mL of a test bacterial suspension was uniformly inoculated, and then cultured in a thermostatic chamber adjusted to 28° C. for 18 hours. After the culture, the evaluation samples were dipped in 50 mL of a sterilized physiological salt solution and sufficiently dispersed by a rotary shaker to obtain a bacteria dispersion solution. The bacterial count in the obtained bacterial dispersion solution was measured by a pour plate culture method to set it as a viable cell count.

From the initial bacterial count and the viable count obtained above, viable count/initial bacterial count was calculated to evaluate antibacterial properties. The results were shown in Table 2. In the evaluation criteria of Table 2, the "single circle (good)" indicates that viable count/initial bacterial count was less than $1/100$; the "triangle (relatively poor)" indicates that viable count/initial bacterial count was $1/100$ or more and 1 or less; and the "cross mark (unacceptable)" indicates that viable count/initial bacterial count exceeded 1.

<Evaluation of Deodorant Properties>

Figure 3:
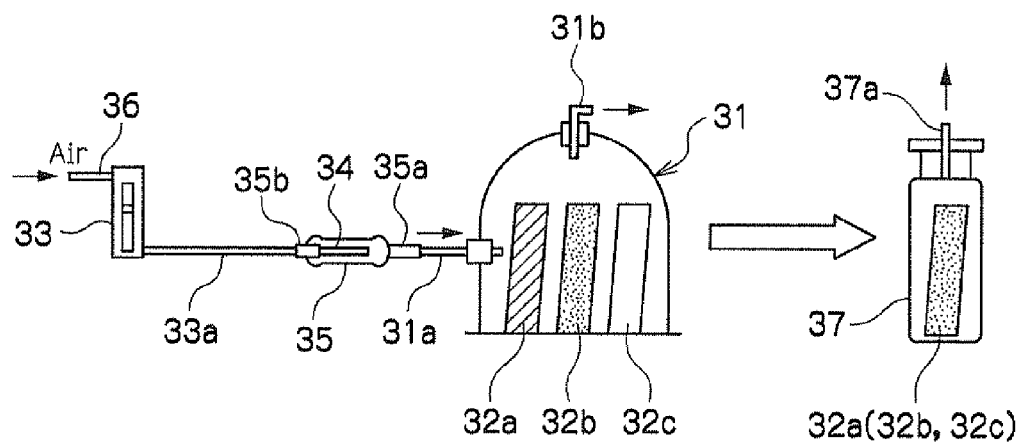
FIG. 3 is an explanatory view of an apparatus for testing the adhesion of a tobacco odor component and a method therefor.

Deodorant properties were evaluated using an apparatus for testing adhesion of tobacco odor components, shown in FIG. 3. The apparatus has, as shown in FIG. 3, bell-shaped glass container 31 for housing test samples 32a, 32b, and 32c, smoking pipe 35 housing tobacco 34 and connected to bell-shaped glass container 31 through duct 31a, flow meter 33 connected to inlet 35b of smoking pipe 35 through duct 33a, and air supply duct 36 connected to smoking pipe 35. One or more types of samples are housed in bell-shaped glass container 31 and a predetermined amount of air is infused into the smoking pipe through duct 36, flow meter 33, duct 33a, and inlet 35b to cause the tobacco to produce smoke. The odor component-containing tobacco smoke is infused into container 31 through outlet 35a and duct 31a. The odor component adheres to the samples, while the remaining smoke is removed from container 31 through outlet 31b. The samples are placed in a GC-MS analyzer to measure an amount of substance volatilized from the samples by the GC-MS analyzer. In this test, 23 samples in total consisting of fin portions 32b of Examples 1 to 14, fin portions 32c of Comparative Examples 1 to 8, and fin portion 32c of Comparative Example 9 were placed in the bell-shaped container to be exposed to the smoke of tobacco in the above-described manner until the tobacco burned out. After that, each of samples 32a, 32b, and 32c was placed in GC-MS analyzer 37 with opening 37a for GC-MS analysis. An amount of odor component adhesion to each sample was represented by the amount of substance volatilized from the sample. In addition, as a reference, using the amount of a volatilized substance in sample 32c (Comparative Example 15) that is an existing film-coated product and regarded as having good deodorant properties, the amounts of volatilization of samples 32a and 32b were represented by comparative values with respect to the amount of volatilization in the sample 32c.

Deodorant properties were evaluated from the comparative values with respect to the amount of volatilization of Comparative Example 15 (reference) obtained from above. The results were shown in Table 2. In the evaluation criteria of Table 2, the "single circle (good)" indicates a case of 1.00 or less, and the "cross mark (unacceptable)" indicates a case of more than 1.00.

TABLE 1

Table 1 (N02-P008)

| | First protective layer | | | Second protective layer | | | | |
| --- | --- | --- | --- | --- | --- | --- | --- | --- |
| | | | | Essential components | | | Total | Dry |
| | | Coating weight | mole | ratio (*2) | | | amount | mass |
| | Elements | of V mg/m$^2$ | ratio (*1) | (1) | (2) | (3) | ratio (*3) | g/m$^2$ |
| Example 1 | V, Ti | 100 | 1.0 | 0.10 | 0.60 | 0.30 | 80.7% | 0.50 |
| Example 2 | V, Zr | 50 | 1.6 | 0.50 | 0.45 | 0.05 | 72.3% | 0.50 |
| Example 3 | V, Ti, Zr | 2 | 5.0 | 0.45 | 0.30 | 0.25 | 76.9% | 1.50 |
| Example 4 | V, Ti, Zr, Hf | 20 | 4.4 | 0.65 | 0.25 | 0.10 | 73.2% | 2.00 |
| Example 5 | V, Ti, Zr | 80 | 1.5 | 0.80 | 0.15 | 0.05 | 65.0% | 0.30 |
| Example 6 | V, Ti, Zr | 120 | 1.2 | 0.70 | 0.10 | 0.20 | 100% | 0.70 |
| Example 7 | V, Ti | 200 | 0.5 | 0.60 | 0.30 | 0.10 | 84.1% | 1.00 |
| Example 8 | V, Ti | 20 | 2.0 | 0.55 | 0.30 | 0.15 | 90.0% | 0.05 |
| Example 9 | V, Zr | 20 | 0.1 | 0.70 | 0.20 | 0.10 | 65.0% | 1.00 |
| Example 10 | V, Ti, Zr | 40 | 1.5 | 0.30 | 0.60 | 0.10 | 64.0% | 0.70 |
| Example 11 | V, Ti, Zr, Hf | 20 | 2.2 | 0.45 | 0.25 | 0.30 | 74.5% | 0.50 |
| Example 12 | V, Zr | 100 | 0.5 | 0.60 | 0.30 | 0.10 | 76.7% | 6.00 |
| Example 13 | V, Ti | 0.3 | 4.6 | 0.75 | 0.15 | 0.10 | 50.0% | 1.50 |
| Comparative Example 1 | V, Zr | 0.1 | 2.0 | 0.60 | 0.30 | 0.10 | 70.0% | 0.50 |
| Comparative Example 2 | Zr, Ti, Hf | — | — | 0.75 | 0.15 | 0.10 | 97.7% | 0.50 |
| Comparative Example 3 | V, Ti | 10 | 3.1 | — | 0.70 | 0.30 | 59.8% | 1.50 |
| Comparative Example 4 | V, Zr | 55 | 0.8 | 0.75 | — | 0.25 | 68.7% | 3.50 |
| Comparative Example 5 | V, Ti, Zr | 75 | 2.1 | 0.70 | 0.30 | — | 69.5% | 4.50 |
| Comparative Example 6 | V, Ti, Zr | 50 | 0.05 | 0.55 | 0.3 | 0.15 | 96.7% | 0.90 |
| Comparative Example 7 | V, Ti | 20 | 3.2 | 0.85 | 0.1 | 0.05 | 81.7% | 1.00 |
| Comparative Example 8 | V, Ti, Zr, Hf | 30 | 2.5 | 0.05 | 0.65 | 0.3 | 62.5% | 0.30 |
| Comparative Example 9 | V, Ti | 25 | 1.6 | 0.75 | 0.05 | 0.2 | 60.0% | 0.20 |
| Comparative Example 10 | V, Zr | 40 | 2.0 | 0.3 | 0.65 | 0.05 | 64.0% | 0.70 |
| Comparative Example 11 | V, Ti, Zr | 50 | 0.8 | 0.48 | 0.5 | 0.02 | 100% | 0.50 |
| Comparative Example 12 | V, Ti | 40 | 2.2 | 0.60 | 0.30 | 0.10 | 90.0% | 0.02 |
| Comparative Example 13 | V, Zr | 40 | 1.0 | 0.50 | 0.25 | 0.25 | 40.0% | 1.00 |
| Comparative Example 14 | Zr phosphate system conversion (not include V) | | | Not include essential components | | | | 0.45 |
| Comparative Example 15 | Zr system conversion (not include V) | | | Not include essential components | | | | 0.25 |

(*1) The mole ratio means a mole ratio of total coating weight of at least one or more types of the metals selected from Ti, Zr, and Hf when the coating weight of V is 1.
(*2) The essential components ratio is equal to Solid content mass ratio, (1)/{(1) + (2) + (3)}, (2)/{(1) + (2) + (3)} and (3)/{(1) + (2) + (3)}.
(*3) The total amount ratio means a total amount ratio of the essential components (a total amount ratio of solid content mass ratio) of (1), (2) and (3) contained in the second protective layer.

TABLE 2

Table 2 (N02-P008)

Result of Evaluation

| | Hydrophilicity | | Corrosion Resistance | | Antibacterial | Deodrant |
| --- | --- | --- | --- | --- | --- | --- |
| | Initial hydrophilicity | Hydrophilicity after running the water | SST | Humidity | Properties | Properties (*1) |
| Example 1 | ○ | ○ | ⊙ | ⊙ | ○ | 0.85 (○) |
| Example 2 | ○ | ○ | ○ | ⊙ | ○ | 0.88 (○) |
| Example 3 | ○ | ○ | ⊙ | ⊙ | ○ | 0.91 (○) |
| Example 4 | ○ | ○ | ⊙ | ⊙ | ○ | 0.95 (○) |
| Example 5 | ○ | ○ | ⊙ | ⊙ | ○ | 0.90 (○) |
| Example 6 | ○ | ○ | ○ | ○ | ○ | 0.85 (○) |
| Example 7 | ○ | ○ | ⊙ | ⊙ | ○ | 0.85 (○) |
| Example 8 | ○ | ○ | ⊙ | ⊙ | ○ | 0.99 (○) |
| Example 9 | ○ | ○ | ⊙ | ⊙ | ○ | 0.80 (○) |
| Example 10 | ○ | ○ | ○ | ⊙ | ○ | 0.81 (○) |
| Example 11 | ○ | ○ | ⊙ | ⊙ | ○ | 0.87 (○) |
| Example 12 | ○ | ○ | ⊙ | ⊙ | ○ | 0.78 (○) |
| Example 13 | ○ | ○ | ⊙ | ⊙ | ○ | 0.85 (○) |
| Comparative Example 1 | ○ | ○ | □ | Δ | ○ | 0.98 (○) |
| Comparative Example 2 | ○ | ○ | Δ | X | ○ | 0.88 (○) |
| Comparative Example 3 | ○ | ○ | ⊙ | ⊙ | X | 1.85 (X) |
| Comparative Example 4 | Δ | X | ⊙ | ⊙ | ○ | 0.85 (○) |
| Comparative Example 5 | Δ | X | ⊙ | ⊙ | ○ | 0.88 (○) |
| Comparative Example 6 | ○ | ○ | Δ | X | ○ | 0.95 (○) |
| Comparative Example 7 | Δ | X | ⊙ | ⊙ | ○ | 0.85 (○) |
| Comparative Example 8 | ○ | ○ | ⊙ | ⊙ | X | 1.75 (X) |
| Comparative Example 9 | Δ | X | ⊙ | ⊙ | ○ | 0.88 (○) |
| Comparative Example 10 | ○ | ○ | ⊙ | ⊙ | ○ | 1.45 (X) |
| Comparative Example 11 | Δ | X | ⊙ | ⊙ | ○ | 0.92 (○) |
| Comparative Example 12 | ○ | Δ | ○ | ○ | Δ | 1.55 (X) |
| Comparative Example 13 | ○ | Δ | ⊙ | ⊙ | Δ | 1.50 (X) |
| Comparative Example 14 | ○ | ○ | ⊙ | X | ○ | 2.45 (X) |
| Comparative Example 15 | X | Δ | X | ○ | ○ | 1.00 (Reference) |

(*1) Reference is a value of Comparative Example 15(1.00), "○" indicates 1.00 or less, and "X" indicates more than 1.00.
⊙ (double circle): excellent
□ (square): relatively poor
○ (single circle): good
Δ (triangle): poor As obvious from the results of Table 2, the heat exchangers of Examples 1 to 13 sufficiently had all of excellent hydrophilicity, high corrosion resistance properties, antibacterial properties, and deodorant properties. On the contrary, the heat exchangers of Comparative Examples 1, 2, and 6 showed insufficient corrosion resistance. In addition, Comparative Examples 3 and 8 had sufficient antibacterial properties and deodorant properties, and Comparative Examples 4, 5, 7, 9, and 11 showed insufficient hydrophilicity. Additionally, in Comparative Examples 12 and 13, hydrophilicity after running the water, antibacterial properties, and deodorant properties were insufficient. Furthermore, Comparative Example 14 was insufficient in terms of corrosion resistance under the humid atmosphere and deodorant properties, and Comparative Example 15 was insufficient in terms of hydrophilicity and corrosion resistance to the salt spray.

Description of the Reference Numerals

| | |
| --- | --- |
| 1 | Aluminum or aluminum alloy material |
| 2, 2' | First protective layer |
| 3, 3' | Second protective layer |
| 10 | Aluminum or aluminum alloy material having a surface treatment coating film |
| 20 | Heat exchanger "metal material including aluminum, and having hydrophilic coating film" |
| 21 | Heat radiating portions (fins) |
| 22 | Adjacent refrigerant pipes (tubes) |
| 31 | Bell-shaped glass container |
| 31a | Duct |
| 31b | Outlet |
| 32a | Fin portions of Examples 1 to 14 |

-continued

| | Description of the Reference Numerals |
|---|---|
| 32b | Fin portions of Comparative Examples 1 to 8 |
| 32c | Fin portion of Comparative Example 9 |
| 33 | Flow meter |
| 33a | Duct |
| 34 | Tobacco |
| 35 | Smoking pipe |
| 35a | Outlet |
| 35b | Inlet |
| 36 | Air supply duct |
| 37 | GC-MS analyzer of volatile constituent |
| 37a | Opening |

The invention claimed is:

1. An aluminum or aluminum alloy material, comprising:
a substrate formed by an aluminum or aluminum alloy;
a first protective layer on a surface of the substrate; and
a second protective layer on the first protective layer, wherein
the first protective layer is a conversion coating film including vanadium and at least one or more types of metals selected from the group consisting of titanium, zirconium, and hafnium, a coating weight of the vanadium is 0.3 to 200 mg/m$^2$, and a total coating weight of the at least one or more types of the metals selected from the group consisting of titanium, zirconium, and hafnium is 0.1 to 5 in mole ratio when the coating weight of the vanadium is 1; and
the second protective layer is an organic coating film having a composition that includes (1) a chitosan derivative and a solubilizing agent therefore, (2) a modified polyvinyl alcohol formed by graft polymerization of a hydrophilic polymer to a side chain of polyvinyl alcohol, and (3) a water-soluble crosslinking agent, wherein a total of the compounds (1) to (3) is 50% by mass or more of the entire second protective layer in terms of solid content, and wherein solid content mass ratios of the respective compounds (1) to (3) are (1)/{(1)+(2)+(3)}=0.1 to 0.8, (2)/{(1)+(2)+(3)}=0.1 to 0.6, and (3)/{(1)+(2)+(3)}=0.05 to 0.3; and a dry mass of the second protective layer per unit area is 0.05 to 6.0 g/m$^2$.

2. A heat exchanger formed by the aluminum or aluminum alloy material according to claim 1.

3. The aluminum or aluminum alloy material according to claim 1, wherein
the side chain hydrophilic polymer possessed by the modified polyvinyl alcohol (2) forming the second protective layer is one or more types of polymers selected from the group consisting of polyoxyalkylene ether, polyvinylpyrrolidone, polyvinylamine, and polyethyleneimine.

4. The aluminum or aluminum alloy material according to claim 3, wherein
the water-soluble crosslinking agent (3) forming the second protective layer is one or more types of acid selected from the group consisting of hydroxyethylidene diphosphonic acid, nitrilotrimethylene phosphonic acid, phosphonobutane tricarboxylic acid, ethylenediamine tetramethylene phosphonic acid, and phytic acid.

5. A heat exchanger formed by the aluminum or aluminum alloy material according to claim 3.

6. The aluminum or aluminum alloy material according to claim 1, wherein
the water-soluble crosslinking agent (3) forming the second protective layer is one or more types of acid selected from the group consisting of hydroxyethylidene diphosphonic acid, nitrilotrimethylene phosphonic acid, phosphonobutane tricarboxylic acid, ethylenediamine tetramethylene phosphonic acid, and phytic acid.

7. A heat exchanger formed by the aluminum or aluminum alloy material according to claim 6.

8. A method for treating a surface of an aluminum or aluminum alloy material, comprising:
surface conditioning an aluminum or aluminum alloy substrate to render a surface of the aluminum or aluminum alloy substrate suitable for formation of a conversion coating film thereon;
water-rinsing the conditioned surfaced of the aluminum or aluminum substrate;
forming a first protective layer made of the conversion coating film on the water-rinsed surface of the aluminum or aluminum alloy substrate;
water-rinsing the first protective layer;
applying a second protective layer as an organic coating film on the first protective layer; and
drying the second protective layer, wherein
the first protective layer is formed from a conversion treatment liquid including vanadium and at least one or more types of metals selected from the group consisting of titanium, zirconium, and hafnium; and
the second protective layer is formed from a composition including (1) a chitosan derivative and a solubilizing agent therefore, (2) a modified polyvinyl alcohol obtained by graft polymerization of a hydrophilic polymer to a side chain of polyvinyl alcohol, and (3) a water-soluble crosslinking agent.

9. The method for treating a surface of an aluminum or aluminum alloy material according to claim 8, wherein
in the first protective layer, a coating weight of the vanadium is 0.3 to 200 mg/m$^2$ and a total coating weight of the at least one or more types of metals selected from the group consisting of titanium, zirconium, and hafnium is 0.1 to 5 in mole ratio when the coating weight of the vanadium is 1; and
in the second protective layer, a total of the compounds (1) to (3) is 50% by mass or more, in terms of solid content, of the entire second protective layer, solid content mass ratios of the respective compounds (1) to (3) are (1)/{(1)+(2)+(3)}=0.1 to 0.8, (2)/{(1)+(2)+(3)}=0.1 to 0.6, and (3)/{(1)+(2)+(3)}=0.05 to 0.3, and a dry mass of the second protective layer per unit area is 0.05 to 6.0 g/m$^2$.

* * * * *